(12) United States Patent
Ishiguro et al.

(10) Patent No.: US 7,298,270 B2
(45) Date of Patent: Nov. 20, 2007

(54) IC TAG ADMINISTRATION DEVICE, ROBOT INCLUDING THE IC TAG ADMINISTRATION DEVICE, AND IC TAG ADMINISTRATION METHOD

(75) Inventors: Shin Ishiguro, Tokyo (JP); Junichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 11/216,164

(22) Filed: Sep. 1, 2005

(65) Prior Publication Data

US 2006/0049944 A1    Mar. 9, 2006

(30) Foreign Application Priority Data

Sep. 7, 2004    (JP) .............................. 2004/260244

(51) Int. Cl.
*G08B 13/14*    (2006.01)
*H04Q 5/22*    (2006.01)
(52) U.S. Cl. .............................. 340/572.1; 340/572.4; 340/10.51
(58) Field of Classification Search .............. 340/572.1, 340/10.51, 572.4, 568.1, 5.23; 235/375, 235/382.5, 436, 462.15; 700/90
See application file for complete search history.

(56) References Cited

U.S. PATENT DOCUMENTS

| 7,000,834 B2 * | 2/2006 | Hind et al. | ................. | 235/385 |
| 2001/0040184 A1 * | 11/2001 | Ohki et al. | ................. | 235/380 |
| 2007/0024426 A1 * | 2/2007 | Akiyama et al. | .......... | 340/10.5 |

FOREIGN PATENT DOCUMENTS

JP    2000-30150    1/2000

* cited by examiner

*Primary Examiner*—Toan N. Pham
(74) *Attorney, Agent, or Firm*—McGinn IP Law Group, PLLC

(57) ABSTRACT

An IC tag administration device includes an information reader which reads original information from an IC tag added to a product, a transformation unit which transforms the original information read by the information reader to information, to which a predetermined local rule is applied, under the local rule, and an information writing unit which rewrites the original information of the IC tag by using the local rule applied information.

25 Claims, 17 Drawing Sheets

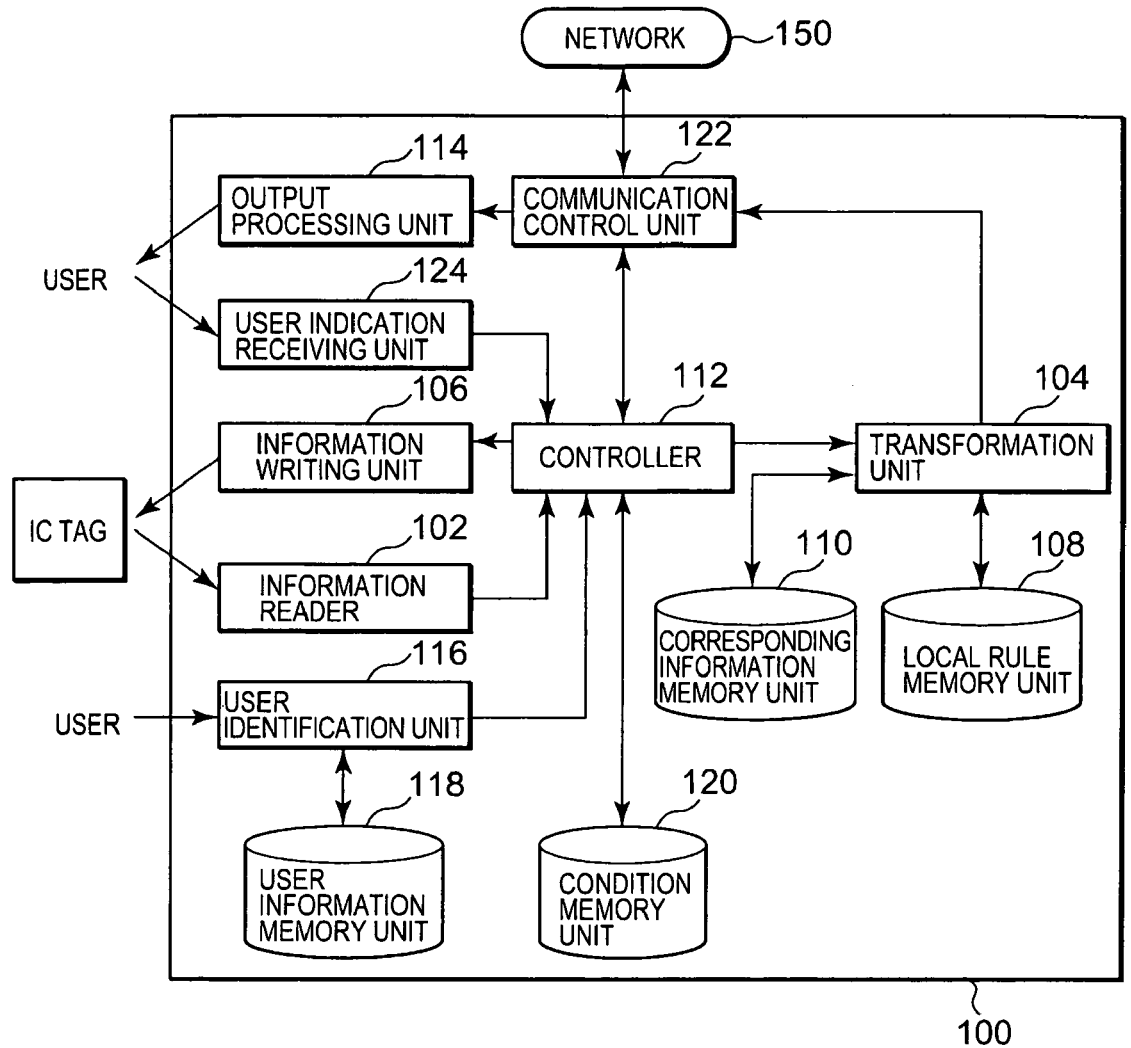

FIG. 12

| IC TAG ID | LOCAL RULE | USER ID |
|---|---|---|
| abc1 | 1 | MOTHER |
| abc2 | 2 | FAMILY |
| abc3 | 2 | FAMILY |
| : | : | : |

| IC TAG ID | PRODUCT INFORMATION | ADDITIONAL INFORMATION | POSITIONAL INFORMATION |
|---|---|---|---|
| abc1 | RING, RUBY, GOLD | PRESENT FROM HUSBAND | BEDROOM |
| abc2 | BOOK, OOXX, WRITTEN BY OO | — | LIVING ROOM |
| abc3 | BOOK, XXOO, WRITTEN BY XO | — | — |
| : | : | : | : |

210

IC TAG ADMINISTRATION DEVICE, ROBOT INCLUDING THE IC TAG ADMINISTRATION DEVICE, AND IC TAG ADMINISTRATION METHOD

BACKGROUND OF THE INVENTION

1. Field of the Invention

The present invention relates to an IC tag administration device, a robot including the IC tag administration device, and an IC tag administration method.

2. Description of the Related Art

Recently, a noncontact IC tag is put into practical use. Since data is read/written from/to the noncontact IC tag via electric waves in the noncontact state, it is expected in the future that the noncontact IC tag is attached to various products and the attached IC tag is used for solid identification of the product in the distribution thereof.

Japanese Unexamined Patent Application Publication No. 2000-30150 (Patent Document 1) discloses a product registering system, in which a product is registered by using a radio frequency identification tag attached to the product and thus shoplifting is prevented by the radio frequency identification tag.

The product registering system disclosed in Japanese Unexamined Patent Application Publication No. 2000-30150 operates as follows.

(1) The radio frequency identification tag stores product information such as a product code specific to each product sold in a shop, and is attached to the product.

(2) Sales data of the radio frequency identification tag of the product bought by a customer at a counter is registered.

(3) A command for clearing product information is sent to the radio frequency identification tag, thereby clearing the product information from the radio frequency identification tag.

(4) A shop assistant detaches the radio frequency identification tag attached to the product.

(5) The radio frequency identification tag is sensed at the exit of the shop and, if the product information of the radio frequency identification tag is included, an alarm sound against the shoplifting is generated.

On the other hand, the data is read/written in the noncontact IC tag in the noncontact state. Therefore, there is a problem that another person may steal/obtain/sense information of the IC tag and grasps the individual customer's information such as his things or tastes. By the same token, the IC tag is detached from the product in the shop or the information of the IC tag is erased, when a consumer purchases the product. However, individuals may effectively use the information of the IC tag in many cases, and therefore the detachment of the IC tag or erasure of the IC tag contents is not preferable for such an application.

SUMMARY OF THE INVENTION

In view of the foregoing and other, exemplary problems, drawbacks, and disadvantages, exemplary feature of the present invention is to provide a technology for preventing the operation for snatching (e.g., stealing) the information of the IC tag by another person and for effectively using the information of the IC tag in the case of handling the product having the IC tag.

According to the present invention, there is provided 1. An IC tag administration device includes: a reader which reads original information from an IC tag added to an object; a transformation unit which transforms the original information read by the reader to local rule applied information based on a predetermined local rule; and a writing unit which rewrites the original information of the IC tag by the local rule applied information.

Herein, the IC tag administration device includes a local-rule memory unit which stores a predetermined local rule. The transformation unit reads the predetermined local rule from the local rule memory unit, and transforms the original information into the local rule applied information under the local rule. The local rule memory unit may be included in a server different from the IC tag administration device. In this case, the transformation unit reads the predetermined local rule from the local rule memory unit via a radio network or a wiring network. Further, the local rule memory unit may store a plurality of local rules. In this case, the transformation unit may properly select and use any of the local rules.

The IC tag is a small memory device which can be identified by individual IDs. Typically, the IC tag is an RFID (Radio Frequency identification) tag. Further, the IC tag can be rewritten. The original information may be code information (product specification number) for identifying the IC tag. The original information also may be product information such as a country of production of a product, a maker of the product, a product name, and producer information, in addition to the code information.

The writing unit may add information indicating that the local rule is applied to the IC tag, upon rewriting the original information of the IC tag by using the local rule applied information. Thus, it is determined whether or not the local rule has already been applied to the IC tag, upon reading the information from the IC tag by the reader.

In the IC tag administration device according to the present invention, the information of the IC tag can be rewritten by applying the local rule within a specific area such as home, shop, or company. Thus, it is possible to prevent information of the things of the individual or company to be grasped by another person, without snatching the information of the IC tag added to the product by another person. Further, it is possible to re-transform the information of the IC tag, to which the local rule is applied, into the original information under the local rule stored in the local rule memory unit. As a consequence, the information of the IC tag can be utilized if necessary.

The IC tag administration device according to the present invention may further include: a corresponding information memory unit which stores identification information of the IC tag and information indicating the local rule which is applied to the IC tag with corresponding information therebetween.

With the above-mentioned structure, upon storing the plurality of local rules in the local rule memory unit, it is grasped which local rule is applied. Further, the information of the IC tag, to which the local rule is applied, is re-transformed into the original information.

According to the present invention, the IC tag administration device may further include: an additional-information obtaining unit which obtains additional information that is written to the IC tag.

In this case, the transformation unit transforms the additional information obtained by the additional-information obtaining unit under the local rule applied to the IC tag by referring to the corresponding information memory unit. The writing unit writes the additional information transformed by the transformation unit to the IC tag.

The additional-information obtaining unit adds the additional information based on the user indication.

Further, the IC tag administration device may include a memory unit which stores the type of information to be added in advance.

In this case, the additional-information obtaining unit obtains the type of information which is stored in the memory unit by the IC tag administration device and then the additional-information obtaining unit obtains the information as the additional information.

For example, the IC tag administration device may include a voice identification unit which identifies a user voice.

In this case, when the user voice identified by the voice identification unit includes the type of information stored in the memory unit, the additional-information obtaining unit obtains the information.

Further, when the additional-information obtaining unit obtains the additional information, the transformation unit issues an inquiry, to the user, whether or not the additional information is transformed under the local rule. The transformation unit transforms the additional information based on the inquiry information under the local rule.

Furthermore, the memory unit may store, in advance, the type of the information to be added and whether or not the information is transformed under the local rule. In this case, the transformation unit determines whether or not the additional-information obtaining unit transforms the additional information based on the setting of the memory unit under the local rule.

The IC tag administration device with the above-mentioned structure according to the present invention properly stores information on the product having the IC tag together with the information which is stored in advance in the IC tag. Since the additional information is properly transformed under the local rule, it is possible to prevent the additional information from being snatched by another person.

The writing unit writes the additional information transformed by the transformation unit to the IC tag together with information indicating the addition of the additional information.

Thus, it is possible to distinguish the information which is originally stored in the IC tag from the information which is added later. For example, when one user writes individual information as the additional information to the IC tag, there is a danger that the individual information might be snatched by another person in the case of transferring a product having the additional information indicating that the product stored in the IC tag to another person. The information originally-stored in the IC tag is general one, such as code information for identifying the IC tag in many cases. Then, if the information is erased, it is inconvenient for the user who receives the product. According to the present invention, as the additional information, the information indicating the addition, such as a flag is stored. Therefore, it is possible to distinguish data which is to be erased from data which is not to be erased, based on the presence or absence of the information.

The IC tag administration device according to the present invention may further include: an identification unit which identifies a user; and an initialization receiving unit which receives an initialization indication for initializing the IC tag to which the local rule is applied from the user who is identified by the identification unit.

The initialization receiving unit receives the initialization indication and, then, the transformation unit re-transforms the information to which the local rule is applied to the original information by referring to the corresponding information memory unit.

The writing unit rewrites the information of the IC tag, to which the local rule is applied, by the original information re-transformed by the transformation unit, and erases the additional information.

With the above-mentioned structure according to the present invention, the initialization of the IC tag is indicated upon transferring the product to another person. Therefore, it is possible to selectively erase the additional information which is written later, while the original information stored in the IC tag remains in the IC tag. Since the above indication is performed by only an identified user, another person does not re-transform the information of the IC tag to which the local rule is applied, and a danger for wrongfully obtaining the additional information of the IC tag by another person is prevented.

The IC tag administration device according to the present invention may further include: an identification unit which identifies a user. The transformation unit re-transforms information stored in the IC tag, to which the local rule is applied, under the local rule applied to the IC tag by referring to the corresponding information memory unit based on a user indication identified by the identification unit.

In the IC tag administration device according to the present invention, since only the identified user indicates the re-transformation, another person without authority does not re-transform the information of the IC tag, to which the local rule is applied, and the danger for snatching the IC tag by another person is prevented.

The IC tag administration device according to the present invention may further include an output processing unit which outputs the information re-transformed by the transformation unit.

As a consequence, the identified user grasps the information on the product having the IC tag based on the information of the IC tag, to which the local rule is applied. For example, when the original information of the IC tag is the code information, the output processing unit sends the code information serving as the original information to the server connected via a network based on the user indication, and obtains the information on the product corresponding to the code information.

The output processing unit displays the product information on the display unit or outputs it as voice information. Further, when the original information of the IC tag is the product information, the output processing unit displays the product information serving as the original information on the display unit or outputs it as voice based on the user indication.

The writing unit in the IC tag administration device according to the present invention rewrites the IC tag by using the information re-transformed by the transformation unit.

Thus, the identified user allows the information of the IC tag, to which the local rule is applied, to be rewritten to the original information, if necessary. Therefore, the information of the IC tag is read by using a normal IC tag reader.

The IC tag administration device according to the present invention may further include: an object information memory unit which stores the identification information of the IC tag and a keyword of a product having the IC tag with corresponding information therebetween; an identification unit which identifies the user; a keyword obtaining unit which obtains the keyword of the product serving as a sensing target from the user identified by the identification unit; and a sensing unit which senses the object as the sensing target by referring to the object information memory unit based on the keyword obtained by the keyword obtaining unit.

The keyword obtaining unit obtains a keyword which is inputted via an operation unit by the user or a keyword included in user voice. Then, for example, the location of a missing article is found based on the indication of the identified user.

In the IC tag administration device according to the present invention, the object information memory unit may store positional information of the product with corresponding information between the positional information and the identification information of the IC tag. The sensing unit may sense the product as the sensing target in consideration of the positional information of the product.

According to the present invention, the product serving as the sending target is sensed promptly.

The IC tag administration device according to the present invention may further include: an image capturing unit, and a user information memory unit which stores user face image data. The identification unit may identify the user based on image data captured by the image capturing unit and face image data stored in the user information memory unit.

Thus, the user is identified without inputting a password or ID by the user, and thus it is further convenient for the user.

The IC tag administration device according to the present invention may further include: a condition memory unit which stores a product condition for rewriting the original information to the information to which the local rule is applied. The transformation unit determines whether or not the original information is rewritten with the information to which the local rule is applied based on the original information read by the reading unit and, upon determining that the original information is rewritten, rewrites the original information to the information to which the local rule is applied.

The condition memory unit, for example, may store the type of product and the price of product and whether or not the original information needs to be rewritten to the local rule applied information, with corresponding information thereamong. When another person snatches an expensive product in the home, there is a danger that the expensive product might be stolen. Therefore, the setting of the condition memory unit enables the application of the local rule only to the expensive product. Further, when the local rule is applied to each food or consumable supply, it is troublesome. Thus, the setting of the condition memory unit controls an operation for preventing the application of the local rule to the food or consumable supply.

The IC tag administration device according to the present invention may further include: a speech recognition unit which identifies a user voice and receives a user indication as voice, and a voice output unit which outputs the voice.

With the above-mentioned structure, the user's convenience is improved by the user's interactive indication to the IC tag administration device.

According to the present invention, an autonomously moving robot includes: any of the above-mentioned IC tag administration devices, a moving unit which moves the IC tag administration device, and an operation control unit which controls the moving unit.

With the above-mentioned structure in which the robot that is autonomously moved includes IC tag administration device, the robot is autonomously moved within a specific area such as home, shop or company and therefore the information of the IC tag added to the product within the specific area is sequentially rewritten.

The robot according to the present invention may further include: a positional information obtaining unit which obtains a position thereof. In this case, the operation control unit controls the moving unit based on the position of the positional information obtaining unit obtained thereby.

Since the robot recognizes the position thereof, the information of the IC tag added to the product within the specific area may be efficiently rewritten.

The IC tag administration device according to the present invention may further include an area information memory unit which stores area information within the specific area, serving as a rewriting target of the IC tag. In this case, the robot rewrites the information of the IC tag by circulating within the specific area based on the area information in the area information memory unit and the position of the robot. The area information memory unit stores a position for intensive circulation with corresponding information and the robot intensively circulates at the position. Thus, the information of the IC tag is efficiently rewritten.

According to the present invention, a robot includes any of the above-mentioned IC tag administration devices.

The robot may further include: a voice identification unit which identifies a user voice and receives a user indication as voice; an operation determining unit which determines an operation corresponding to the user voice, and a voice output unit which outputs the voice based on the determination of the operation determining unit.

Thus, the robot receives a user indication or obtains necessary information by the interactive communication with the user. The user's convenience is improved.

According to the present invention, an IC tag administration method includes: reading original information from an IC tag added to an object; transforming the original information read in the reading step of the original information to information, to which a predetermined local rule is applied, under the local rule, and rewriting the original information of the IC tag by the information to which the local rule is applied.

According to the present invention, a computer program product for storing a robot control program allows a computer to function as: reading means which reads original information from an IC tag added to a product; transforming means which transforms the original information read by the reading means to information, to which a predetermined local rule is applied, under the local rule; and rewriting means the original information of the IC tag by the information to which the local rule is applied.

According to the present invention, a computer program product for storing a robot control program allows a computer included in a robot having moving means to function as: a reading unit which reads original information from an IC tag added to a product; a transforming unit which transforms the original information read by the reading unit to information, to which a predetermined local rule is applied, under the local rule; a rewriting unit the original information of the IC tag by the information to which the local rule is applied; and an operation control unit which controls the moving unit, and allows the robot to autonomously move.

According to the present invention, the components can arbitrarily be combined. Further, the expression according to the present invention can be transformed among the method, device, and the program.

According to the present invention, in the handling operation of the product having the IC tag, it is possible to prevent the information of the IC tag from being stolen by another person. Further, the information of the IC tag can effectively be used.

BRIEF DESCRIPTION OF DRAWINGS

FIG. 1 is a block diagram showing the structure of an IC tag administration device according to the first exemplary embodiment of the present invention;

FIG. 2 is a diagram showing an example of the internal structure of a condition memory unit;

FIG. 12 is a diagram showing an example of the internal structure of a corresponding information memory unit in the processing shown in FIG. 11;

FIG. 16 is a diagram showing an example of the internal structure of an object information memory unit;

DESCRIPTION OF THE EXEMPLARY EMBODIMENTS

Figure 3:
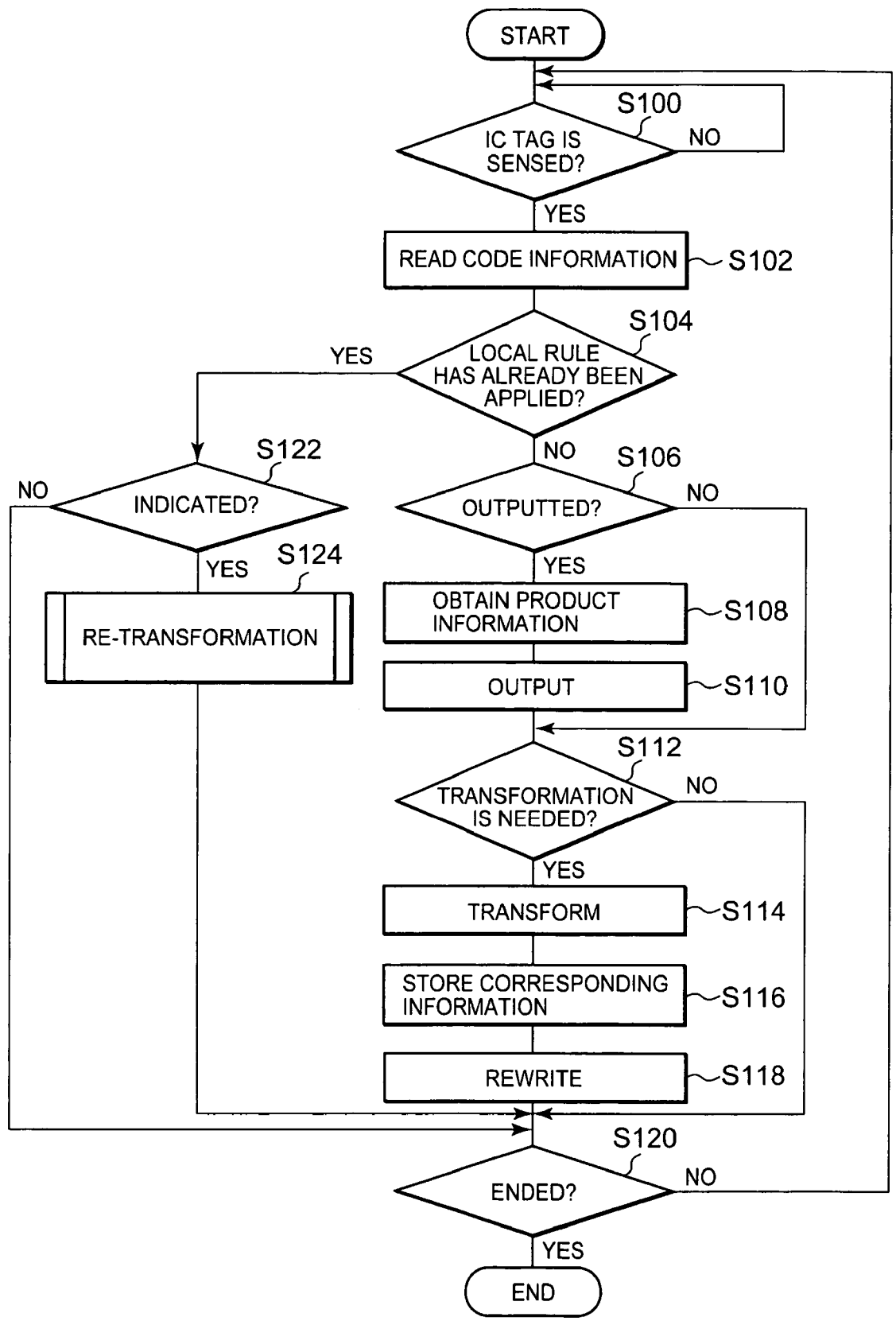
FIG. 3 is a flowchart showing the processing sequence of the IC tag administration device according to the first exemplary embodiment.

A detailed description is given of exemplary embodiments according to the present invention with reference to the drawings.

Hereinbelow, the IC tag administration device transforms, or rewrites the information of the IC tag into the transformed information under the local rule. The IC tag is attached to the product which may be brought to the home.

First Exemplary Embodiment

FIG. 1 is a block diagram showing an IC tag administration device according to the first exemplary embodiment. An IC tag administration device 100 includes: an information reader 102; a transformation unit 104; an information writing unit 106; a local rule memory unit 108; a corresponding information memory unit 110; a controller 112; an output processing unit 114; a user identification unit 116; a user information memory unit 118; a condition memory unit 120; a communication control unit 122; and a user indication receiving unit 124.

According to the first exemplary embodiment, the IC tag added to the product stores code information (product specific number) for identifying the IC tag. For example, the code information includes a country code, a maker code, a product genre, a product code, and the like. The IC tag also includes a user area to which a user can write the data freely. The IC tag administration device 100 obtains product information from a server (not shown) via a network 150 by using, as a key, the code information read from the IC tag.

The information reader 102 reads the code information from the IC tag added to the product.

The controller 112 controls the components in the IC tag administration device 100.

The local rule memory unit 108 stores a predetermined local rule. Examples of the local rules are as follows.

(1) Shift the code information by several bits.
  (a) Apply to the entire code information.
  (b) Apply only to specific code information such as product genre and product code.
(2) Encrypt the code information.
  (a) Method using secret-key encryption.
  (b) Method using public-key encryption. In this case, the encryption key may be known to another person and therefore the key management is easy. For example, one-user encryption key is sent to an IC tag administration device of another user or to a robot including the IC tag administration device by using the above features and then the code information is rewritten by the IC tag administration device or the robot.
  (c) Encrypt the entire code information.
  (d) Encrypt only specific code information such as product genre and product code.
(3) Mask only specific code information such as product genre and product code.
(4) Replace the original code information to new code information set by the IC tag administration device 100.
  (a) Apply to the entire code information.
  (b) Apply to only specific code information such as product genre and product code.

The transformation unit 104 transforms the code information read from the IC tag by the information reader 102 based on the indication of the controller 112. For example, when the code information read from the IC tag by the information reader 102 is the original information which is originally stored in the IC tag, the transformation unit 104 transforms the original information to local rule applied information under a predetermined local rule stored in the local rule memory unit 108.

The transformation unit 104 stores, in the corresponding information memory unit 110, the identification information of the IC tag which stores the local rule applied information and information indicating the local rule applied to the IC tag with corresponding information therebetween. Although the identification information of the IC tag can newly be added, the transformation unit 104 sets, to the identification information of the IC tag, the local rule applied information which is obtained by transforming the original information. Upon newly adding the identification information of the IC tag, the identification information is stored within a writing area of the IC tag.

For example, when the transformation unit 104 transforms the original information read from the IC tag under the local rule (1), the corresponding information memory unit 110 stores therein information indicating to which part of the code information the local rule is applied and information indicating how many bits are shifted, together with the identification information of the IC tag.

For example, when the transformation unit 104 transforms the original information read from the IC tag under the local rule (2), the corresponding information memory unit 110 stores therein information indicating to which part of the code information the local rule is applied and a key for decrypting the encrypted information, together with the identification information of the IC tag.

For example, when the transformation unit 104 transforms the original information read from the IC tag under the local rule (3), the corresponding information memory unit 110 stores therein information indicating to which part of the code information the local rule is applied and information indicating the masked portion of the original information, together with the identification information of the IC tag.

For example, when the transformation unit 104 transforms the original information read from the IC tag under the local rule (4), the corresponding information memory unit 110 stores therein information indicating to which part of the code information the local rule is applied and information indicating a relation between the original code information and the new code information, together with the identification information of the IC tag.

The information writing unit 106 overwrites the original information of the IC tag by using the local rule applied information transformed by the transformation unit 104. Here, when the original information is stored in an area in which the IC tag is not rewritten and is not overwritten by the local rule applied information, the information writing unit 106 erases the original information by a kill code and then writes the local rule applied information to an area for overwriting the IC tag.

The information writing unit 106 writes, to the IC tag, the local rule applied information and information indicating that the information is the local rule applied information.

For example, the information writing unit 106 writes, to a writing area of the IC tag, a flag or a specific bit which is not used as the code information, serving as the information indicating that the information is the local rule applied information. Thus, the information reader 102 determines whether or not the local rule has already been applied to the IC tag upon reading the information of the IC tag.

For example, when the information reader 102 reads the local rule applied information from the IC tag, the transformation unit 104 refers to the local rule memory unit 108 and the corresponding information memory unit 110, and re-transforms the local rule applied information into the original information. The information writing unit 106 overwrites the local rule applied information by using the original information which is re-transformed by the transformation unit 104.

The communication control unit 122 obtains the product information of the product from the server (not shown) via the network 150 by using, as keys, the code information, which is the original information read from the IC tag by the information reader 102, or the re-transformed code information, which is re-transformed by the transformation unit 104.

The output processing unit 114 outputs the product information obtained by the communication control unit 122. The IC tag administration device 100 may include a display unit and a voice output unit (not shown). The output processing unit 114 may display the product information obtained by the communication control unit 122 or may output it by the voice output unit. Further, the output processing unit 114 may transfer the product information to another terminal via a network such as a LAN.

The user identification unit 116 identifies the user of the IC tag administration device 100. The user information memory unit 118 stores the information for identifying the user. According to the first exemplary embodiment, the user information memory unit 118 stores the identification information of a family at the home where the IC tag administration device 100 is arranged.

When the user issues an indication for re-transforming the local rule applied information of the IC tag, which stores the local rule applied information, into the original information, or when the user issues an indication for rewriting the IC tag or an indication for outputting the local rule applied information from the output processing unit 114, the controller 112 allows the user identification unit 116 to identify the user. Only when the user is identified, the user indication is accepted.

The condition memory unit 120 stores a condition for rewriting the original information of the IC tag to the local rule applied information. For example, in the case of the food, drink or a consumable supply which is easily consumed, the need for rewriting the code information of the IC tag is low. On the other hand, in the case of expensive product, the need for rewriting the code information of the IC tag is high. The user presets the condition for rewriting the original information of the IC tag to the local rule applied information based on the product price or the type of product. The condition memory unit 120 stores the setting. Upon sensing the IC tag which stores the original information, the controller 112 refers to the condition memory unit 120 and determines whether or not the original information of the IC tag is rewritten.

The user indication receiving unit 124 receives various indications from the user.

FIG. 2 is a diagram showing one example of the internal structure of the condition memory unit 120.

The condition memory unit 120 includes a type column, a price column, and a transformation YES/NO column. The type column stores the type of product. The price column stores the range of the product price. The transformation YES/NO column stores information indicating whether or not the original information is transformed to the local rule applied information. For example, when the product having the IC tag is food and its value is not more than ¥20,000, the original information of the IC tag does not need to be rewritten. When the product having the IC tag is a jewel, the original information of the IC tag needs to be rewritten to the local rule applied information, irrespective of the price.

In another example, when the code information includes information having the meaning, e.g., the number or character at the specific position in the code information and indicates the type of product, the condition memory unit 120 stores the information having the meaning included in the code information with corresponding information of the transformation YES/NO column.

FIG. 3 is a flowchart showing the processing sequence of the IC tag administration device 100 according to the first exemplary embodiment. The information reader 102 senses the IC tag (YES in step S100) and then reads the code information from the IC tag (in step S102). The controller 112 determines whether or not the local rule has already been applied to the code information read by the information reader 102 (in step S104).

When the local rule has not been applied to the code information read by the information reader 102 (NO in step S104), the controller 112 determines, based on the user indication received from the user indication receiving unit 124 and the code information, whether or not the product information is obtained and is outputted (in step S106). When the controller 112 determines that the product information is obtained and is outputted (YES in step S106), the communication control unit 122 obtains the product information having the IC tag from the server connected via the network 150 by using, as the key, the code information read by the information reader 102 (in step S108). The output processing unit 114 outputs the product information obtained by the communication control unit 122 onto the display unit or the like (in step S110).

The controller 112 determines whether or not the code information of the IC tag needs to be transformed (in step S112). The controller 112 determines, for example, based on the user indication which is received from the user indication receiving unit 124, whether or not the code information of the IC tag is transformed. When the user does not issue the indication, the controller 112 performs the following processing. That is, the controller 112 sends, to the communication control unit 122, the code information read by the information writing unit 106. The communication control unit 122 obtains the product information having the IC tag from the server via the network 150 by using the code information as the key. In step S108, when the product information has already been obtained, the processing is omitted. The controller 112 refers to the condition memory unit 120 and determines, based on the product information obtained by the communication control unit 122, whether or not the code information of the IC tag is rewritten.

When the controller 112 determines that the code information of the IC tag needs to be transformed (YES in step S112), the transformation unit 104 refers to the local rule memory unit 108. The transformation unit 104 transforms, to the local rule applied information, the original information read by the information reader 102 based on the predetermined local rule stored in the local rule memory unit 108 (in step S114). The transformation unit 104 stores the identification information of the IC tag and the local rule applied to the IC tag with corresponding information-therebetween (in step S116) in the corresponding information memory unit 110. The information writing unit 106 rewrites the local rule applied information transformed by the transformation unit 104 to the original information of the IC tag and stores it, and rewrites the code information of the IC tag (in step S118). When the original information of the IC tag is not overwritten and is not stored, the information writing unit 106 erases the original information by the kill code and then writes the local rule applied information to the overwriting area of the IC tag. After that, it is determined whether or not the sensing operation of the IC tag ends (in step S120). If it is determined that the sensing operation of the IC tag does not end (NO in step S120), the sensing operation of the next IC tag is a waited (in step S100). If it is determined that the sensing operation of the IC tag ends (YES in step S120), then the processing ends.

When the controller 112 determines in step S112 that the code information of the IC tag does not need to be transformed (NO in step S112), the processing advances to step S120 from step S112.

When the local rule has already been applied to the code information read by the information reader 102 in step S104 (YES in step S104), the controller 112 determines whether or not the re-transformation of the local rule applied information is indicated from the user (in step S122). When the controller 112 determines that the re-transformation is not indicated from the user (NO in step S122), the processing advances to step S120.

When the controller 112 determines that the re-transformation is instructed from the user in step S122 (YES in step S122), the re-transformation is performed (in step S124).

Figure 4:
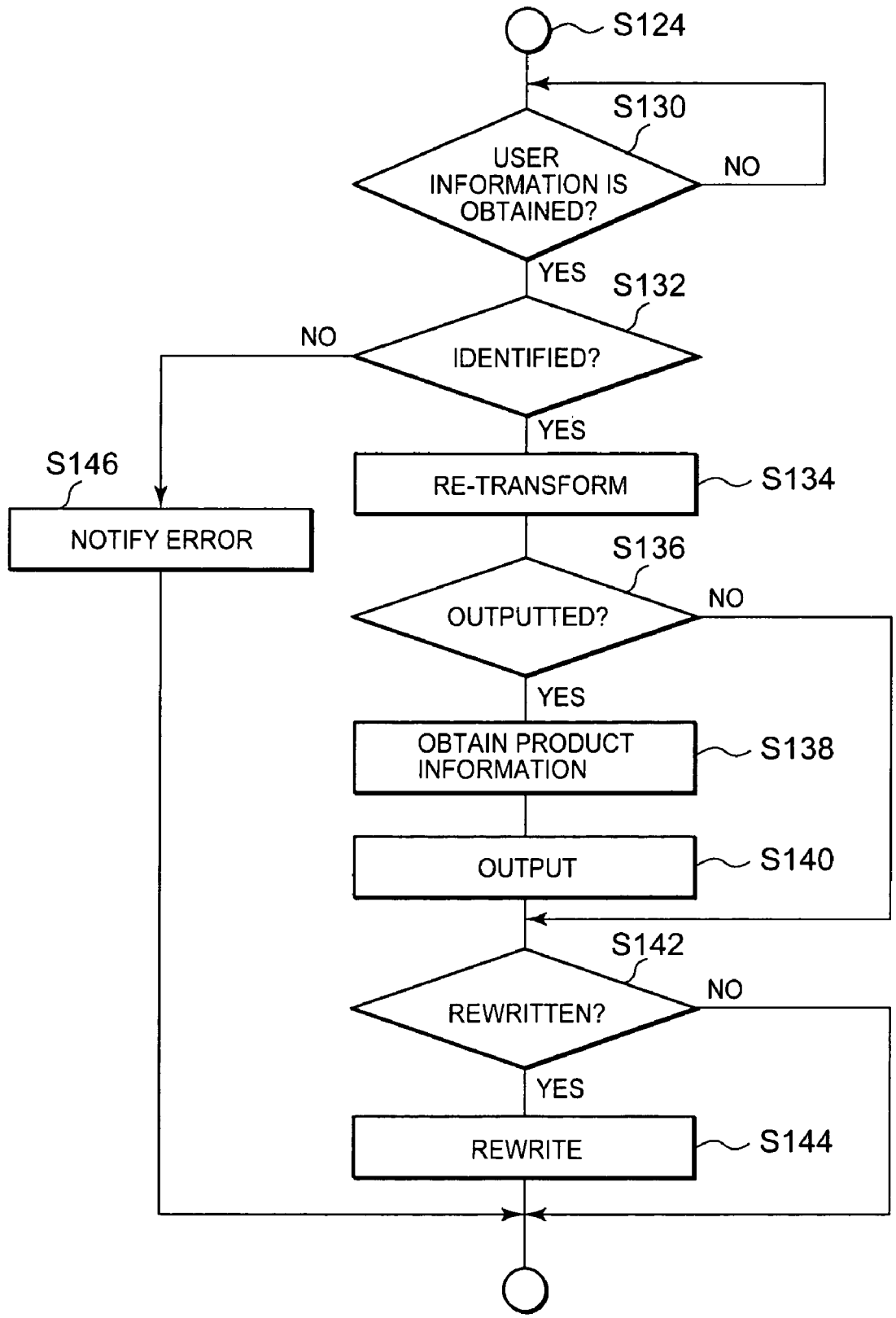
FIG. 4 is a flowchart specifically showing the re-transformation in step S124 in FIG. 3.

FIG. 4 is a flowchart specifically showing the re-transformation shown in step S124 in FIG. 3.

When the controller 112 determines that the re-transformation is indicated from the user (YES in step S122), the user identification unit 116 receives the input of the user information from the user (in step S130). When the user identification unit 116 receives the input of the user information from the user (YES in step S130), the user identification unit 116 refers to the user information memory unit 118 and identifies the user (in step S132). The user is identified by inputting the ID and the password via an operation unit (not shown) by the user or by obtaining the user voice or image. The user information obtaining processing (in step S130) may be performed after the processing of NO in step S100 in FIG. 3. When the user is identified (YES in step S132), the transformation unit 104 refers to the local rule memory unit 108 and the corresponding information memory unit 110 based on the instruction of the controller 112, and re-transforms the local rule applied information read by the information writing unit 106 to the original information (in step S134).

The controller 112 determines, based on the user indication received from the user indication receiving unit 124 and the re-transformed code information, whether or not the product information is obtained and is outputted (in step S136). When the controller 112 determines that the product information is obtained and is outputted (YES in step S136), the communication control unit 122 obtains the product information having the IC tag from the server connected via the network 150 by using, as the key, the code information transformed by the transformation unit 104 (in step S138). The output processing unit 114 outputs, on the display unit or the like, the product information obtained by the communication control unit 122 (in step S140).

The controller 112 determines whether or not the code information of the IC tag is rewritten (in step S142). The controller 112 determines, for example, based on the user indication received from the user indication receiving unit 124, whether or not the code information of the IC tag is rewritten. When the controller 112 determines that the code information of the IC tag is rewritten (YES in step S142), the information writing unit 106 overwrites the local rule applied information of the IC tag by the code information which is re-transformed by the transformation unit 104 (in step S144).

When the user identification unit 116 does not identify the user in step S132 (NO in step S132), the controller 112 outputs an error notification by the output processing unit 114 (in step S146).

After the above-mentioned processing, the re-transformation in step S124 ends. Then, the processing advances to step S120 (in FIG. 3).

According to the first exemplary embodiment, the IC tag administration device 100 is, for example, installed at the entrance of the house. Thus, when the user brings the product having the IC tag to the house, the information of the IC tag is rewritten to the local rule applied information. When the user brings the product having the IC tag out of the house, the information of the IC tag is rewritten to the original information.

According to the first exemplary embodiment, the IC tag administration device 100 may be a mobile terminal, for example, such as mobile telephone, notebook, personal digital assistant (PDA), etc. Thus, the information of the IC tags of various products can be rewritten by bringing the IC tag administration device 100 by the user and moving the IC tag administration device 100. If so, then the information of the IC tag can be rewritten in the still state of the IC tag. Therefore, a writing error is easily not caused and the information of the IC tag can be read and be written without fail.

As mentioned above, in the IC tag administration device 100 according to the first exemplary embodiment, the information of the IC tag is rewritten by applying the local rule within the specific area such as the home, office, hotel, car, boat, etc. It is possible to prevent the information on the individual things from being grasped by another person by stealing the information of the IC tag added to the product by another person.

The information of the IC tag to which the local rule is applied is re-transformed to the original information under the local rule stored in the local rule memory unit 108. Thus, the information of the IC tag can be used if necessary.

Second Exemplary Embodiment

According to the second exemplary embodiment, the IC tag which is added to the product stores the product information having the IC tag. The product information is not the code information, but a producing country of the product, maker, product name, producer information, and the like. Although the product information needs to be obtained from the server via the network 150 by using the code information stored in the IC tag as the key, the IC tag stores the product information in the IC tag administration device 100 according to the second exemplary embodiment. Therefore, according to the second exemplary embodiment, the product information is obtained without the inquiry to the server.

Figure 5:
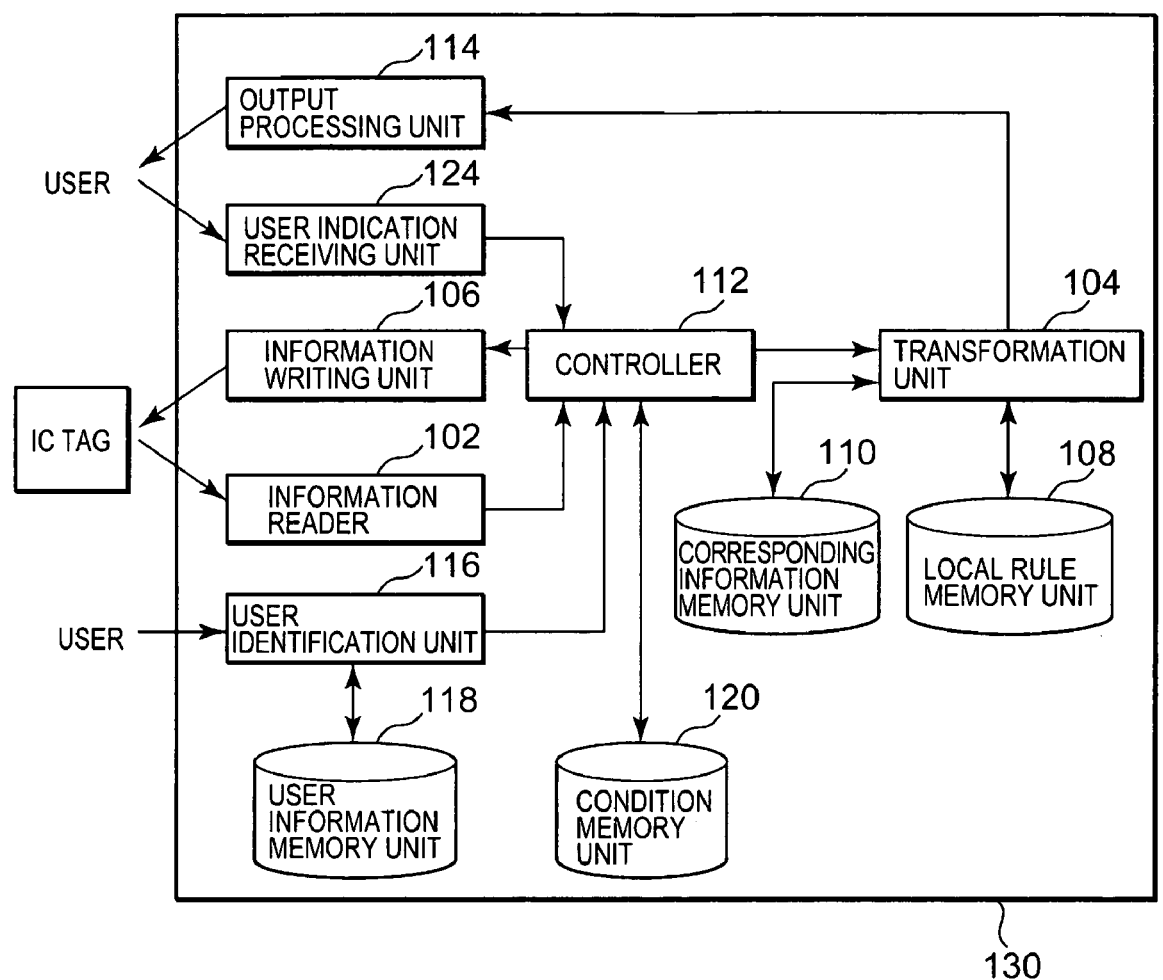
FIG. 5 is a block diagram showing the structure of the IC tag administration device according to the second exemplary embodiment.

FIG. 5 is a block diagram showing the structure of the IC tag administration device according to the second exemplary embodiment.

According to the second exemplary embodiment, an IC tag administration device 130 is different from the IC tag administration device 100 according to the first embodiment because the IC tag administration device 130 does not include the communication control unit 122. According to the second exemplary embodiment, the same reference numerals as those in the IC tag administration device 100 according to the first embodiment denote the same components according to the first embodiment.

Figure 6:
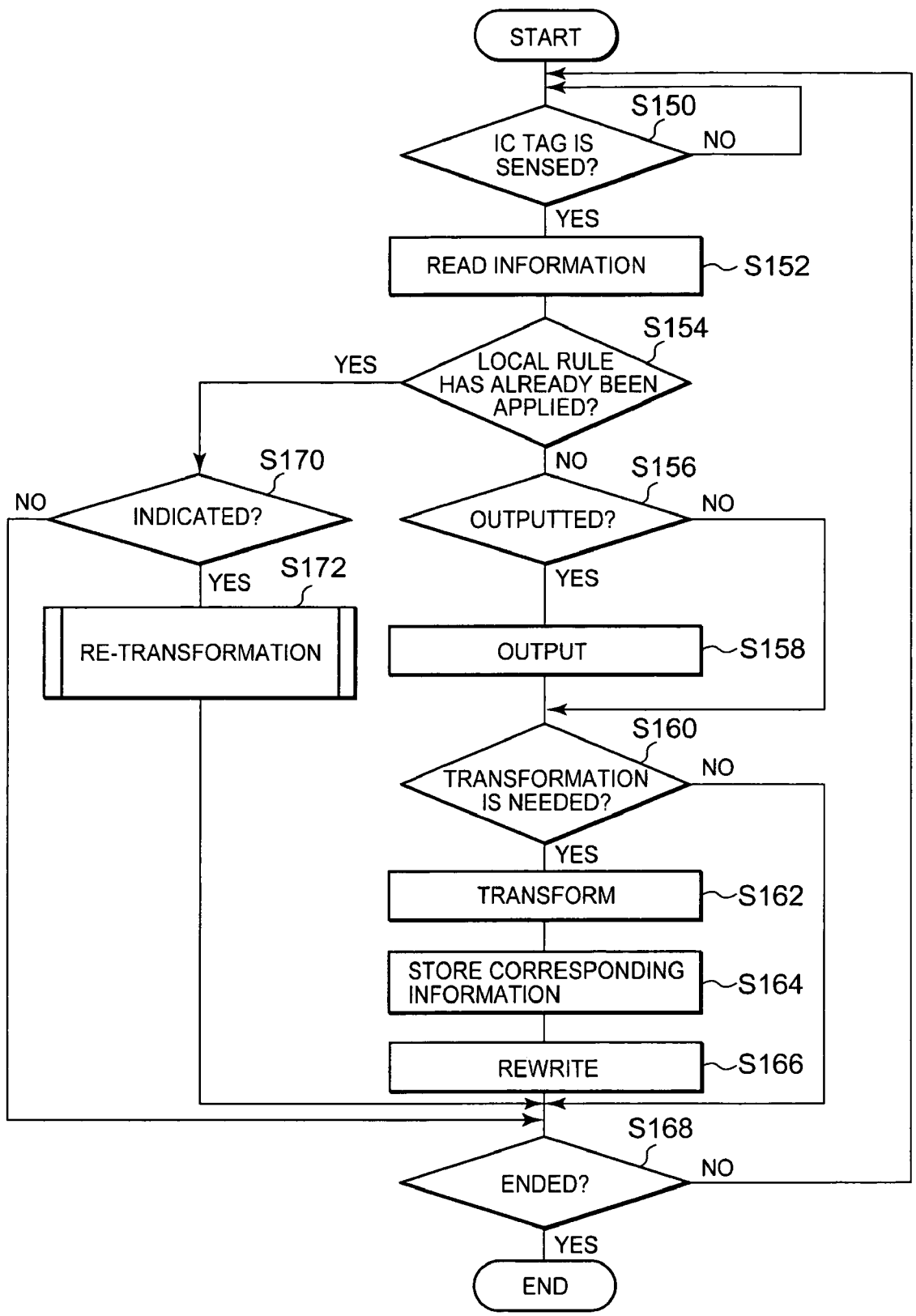
FIG. 6 is a flowchart showing the processing sequence of the IC tag administration device according to the second exemplary embodiment.

FIG. 6 is a flowchart showing the processing sequence of the IC tag administration device 130 according to the second exemplary embodiment. The information reader 102 senses the IC tag (YES in step S150). The information reader 102 reads the product information from the IC tag (in step S152). The controller 112 determines whether or not the local rule has already been applied to the product information read by the information reader 102 (in step S154).

When the controller 112 determines that the local rule has not already been applied to the code information read by the information reader 102 (NO in step S154), the controller 112 determines, based on the user indication received from the user indication receiving unit 124, whether or not the product information is outputted (in step S156). When the controller 112 determines that the product information is outputted (YES in step S156), the output processing unit 114 outputs the product information on the display unit or the like (in step S158).

The controller 112 determines whether or not the information of the IC tag needs to be transformed (in step S160). The controller 112 determines, based on the user indication received from the user indication receiving unit 124, whether or not the information of the IC tag needs to be transformed. When the user does not issue the indication, the controller 112 refers to the condition memory unit 120 and determines, based on the product information, whether or not the code information of the IC tag is rewritten.

When the controller 112 determines that the information of the IC tag needs to be transformed in step S160 (YES in step S160), the transformation unit 104 refers to the local rule memory unit 108 and transforms the original information read by the information reader 102 to the local rule applied information based on the predetermined local rule (in step S162). The transformation unit 104 stores, in the corresponding information memory unit 110, the identification information of the IC tag and the local rule which is applied to the IC tag with corresponding information therebetween (in step S164). The information writing unit 106 overwrites and stores the local rule applied information transformed by the transformation unit 104 to the original information of the IC tag, and rewrites the code information of the IC tag (in step S166). When the original information of the IC tag is not overwritten and is not stored, the information writing unit 106 erases the original information by the kill code. Then, the local rule applied information is written to the overwriting area of the IC tag. After that, it is determined whether or not the sensing processing of the IC tag ends (in step S168). When it is determined that the sensing processing does not end (NO in step S168), the sensing operation of the next. IC tag is waited (in step S150). When it is determined that the sensing processing ends (YES in step S168), the processing ends.

When the code information of the IC tag does not need to be transformed in step S160 (NO in step S160), the processing advances to step S168.

When the local rule has already been applied to the information read by the information reader 102 in step S154 (YES in step S154), the controller 112 determines whether or not the re-transformation of the local rule applied information is indicated from the user (in step S170). When the controller 112 determines that the re-transformation of the local rule applied information is not indicated from the user (NO in step S170), the processing advances to step S168.

When the controller 112 determines that the re-transformation of the local rule applied information is indicated from the user in step S170(YES in step S170), the re-transformation is performed (in step S172).

Figure 7:
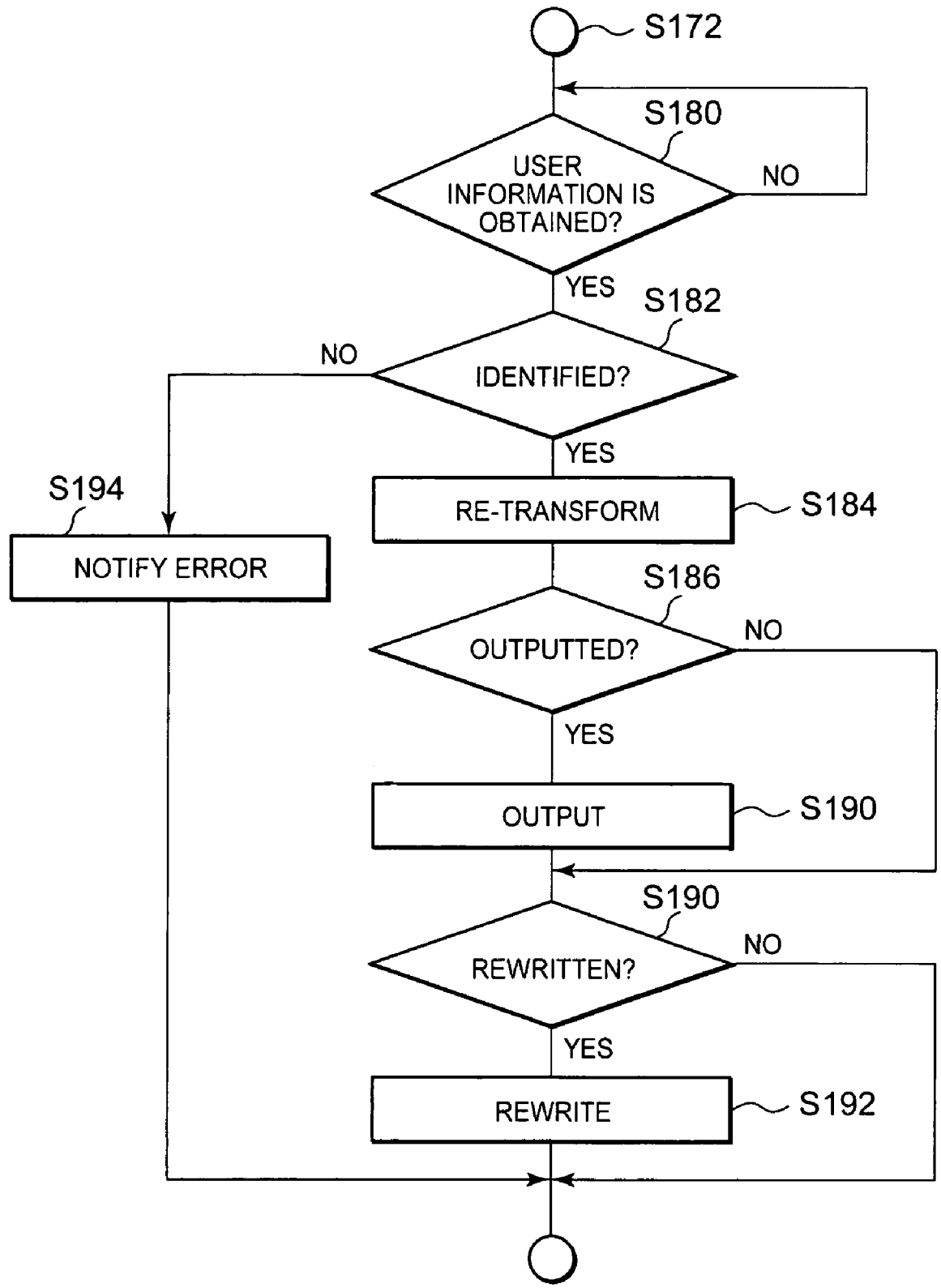
FIG. 7 is a flowchart specifically showing the re-transformation in step S172 in FIG. 6.

FIG. 7 is a flowchart specifically showing the re-transformation in step S172 in FIG. 6.

When the controller 112 determines that the re-transformation of the local rule applied information is indicated from the user (YES in step S170), the user identification unit 116 receives the input of the user information from the user (in step S180). When the user identification unit 116 receives the input of the user information from the user (YES in step S180), the user identification unit 116 refers to the user information memory unit 118 and identifies the user (in step S182). The user is identified by inputting the ID and the password by the user or by obtaining the user voice or image via an operation unit (not shown). When the user is identified (YES in step S182), the transformation unit 104 refers to the corresponding information memory unit 110 and the local rule memory unit 108, and re-transforms the local rule applied information read by the information writing unit 106 to the original information based on the indication of the controller 112 (in step S184).

The controller 112 determines, based on the user indication received from the user indication receiving unit 124, whether or not the re-transformed product information is outputted (in step S186). When the controller 112 determines that the product information is outputted (YES in step S186), the output processing unit 114 outputs, on the display unit, the product information re-transformed by the transformation unit 104 (in step S188).

The controller 112 determines whether or not the code information of the IC tag is rewritten (in step S190). The controller 112 determines, for example, based on the user indication received from the user indication receiving unit 124, whether or not the product information of the IC tag is rewritten to the original information.

When the controller 112 determines that the product information is rewritten (YES in step S190), the information writing unit 106 overwrites the local rule applied information of the IC tag by using the original information re-transformed by the transformation unit 104 (in step S192).

When the user is not identified in step S182 (NO in step S182), the controller 112 allows the output processing unit 114 to notify an error (in step S194).

After the above-described processing, the re-transformation in step S172 ends. Then, the processing advances to step S168 (in FIG. 6).

According to the second exemplary embodiment, the IC tag administration device 130 obtains the same advantages as those in the IC tag administration device 100 according to the first embodiment. According to the second exemplary embodiment, the processing is further fast performed by obtaining the product information having the IC tag without the connection to the network in the case of using the IC tag which stores the product information.

Third Exemplary Embodiment

According to the third exemplary embodiment, the IC tag administration device is provided for an autonomously-moved robot. The robot according to the third exemplary embodiment has a function for identifying a specific partner which is preset and for interactive communication with the user.

The robot is used and thus the following advantages are obtained in addition to the same advantages as those of the IC tag administration device 100 according to the first embodiment.

Since the robot is autonomously moved, the information of the IC tag added to the product at home is sequentially rewritten. Thus, the information of the IC tag added to the product can be rewritten while the product is arranged at a predetermined position. Further, since the robot rewrites the information of the IC tag added to an object in a still state, it is possible to prevent a writing error of the information to the IC tag. Further, if the product is packaged at the purchasing timing, the IC tag is rewritten after opening the package at home. Therefore, the IC tag is rewritten with high precision.

The robot has the function of the interactive communication with the user. Therefore, the user indication is received in the interactive communication with the user and necessary information is obtained. Thus, it is convenient for the user.

Further, the robot identifies the specific partner such as the user and therefore the user is easily identified.

As described above, the autonomously-moved robot includes the IC tag administration device, thereby facilitating the treatment of the IC tag administration device.

Figure 8:
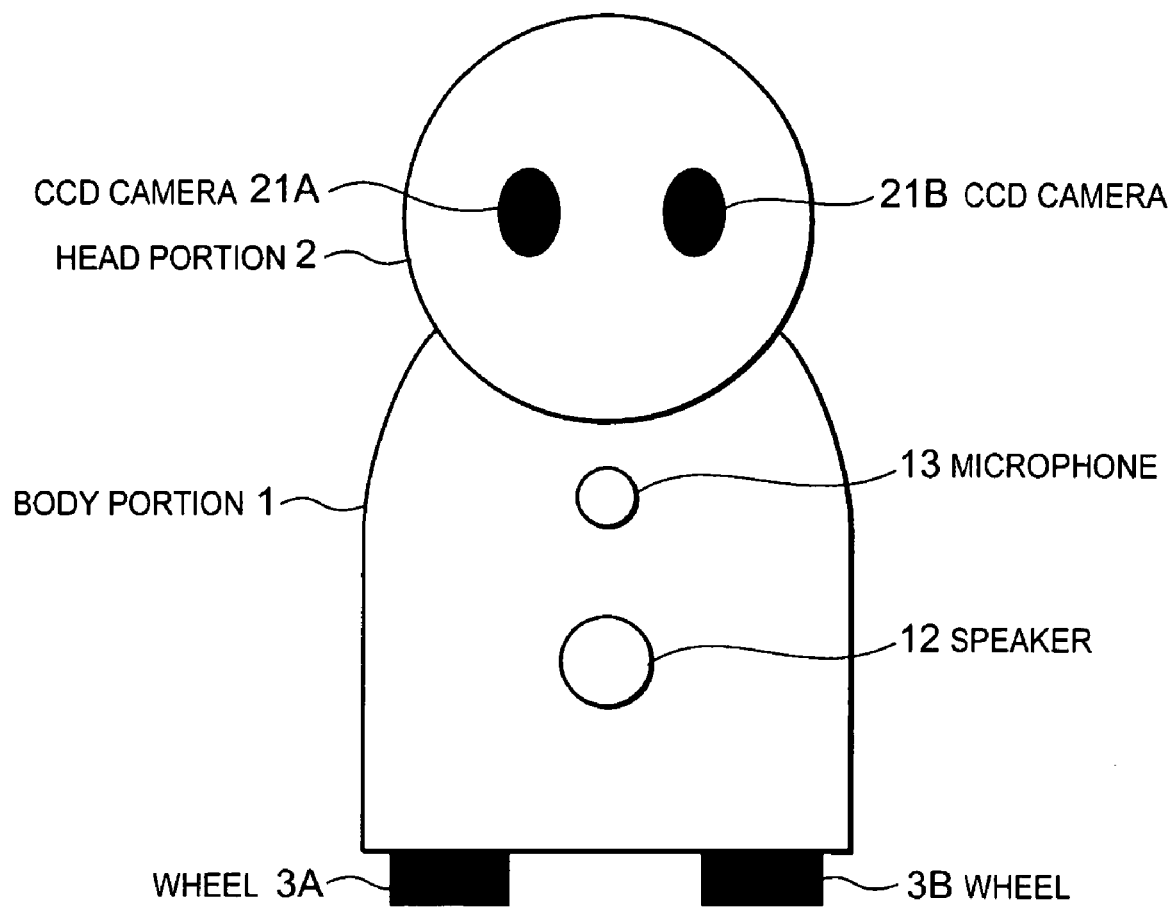
FIG. 8 is a diagram showing the structure of the external appearance of an example of a robot according to the third exemplary embodiment.

FIG. 8 is a diagram showing the external appearance of one example of the robot according to the third exemplary embodiment. For example, a robot 200 is structured by connecting a body portion 1 and a head portion 2. A wheel 3A and a wheel 3B are attached to the left and the right on the bottom of the body portion 1, and the wheel 3A and the wheel 3B are rotated independently.

The head portion 2 is rotated within a predetermined range of the vertical axis that is vertically set to the body portion 1 and the horizontal axis arranged at an angle of 90° in relation to the vertical axis.

The vertical axis is arranged, passing through the center of the head portion 2, and the horizontal axis is horizontally arranged in the left and right directions, passing through the center of the head portion 2, while the body portion 1 and the head portion 2 are directed to the front surface. That is, the head portion 2 is rotated within the predetermined range with the two degrees of freedom in the left and right and up and down directions.

A speaker 12 and a microphone 13 are arranged to the body portion 1. A CCD camera 21A and a CCD camera 21B are arranged to the head portion 2.

Figure 9:
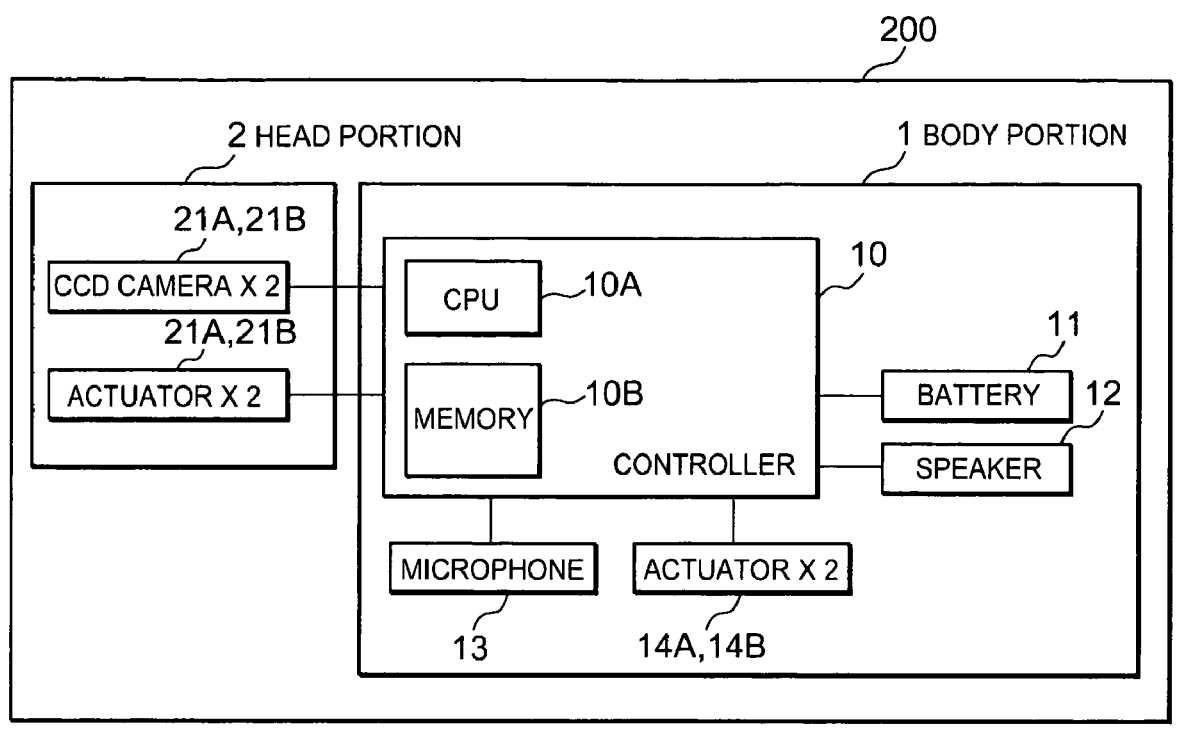
FIG. 9 is a block diagram showing an example of the electric structure of the robot.

FIG. 9 is a block diagram showing an example of the electric structure of the robot 200. The body portion 1 accommodates therein the controller 10 for entirely controlling the robot 200, a battery 11 serving as a power source of the robot 200, the speaker 12, the microphone 13, and actuators 14A and 14B for moving the two wheels.

The microphone 13 collects the peripheral sound, and obtains a voice signal. The microphone 13 sends the obtained sound signal to the controller 10. Although one microphone 13 is shown, a plurality of microphones 13 may be arranged to the robot 200. Thus, the noise is reduced.

The controller 10 includes a CPU 10A and a memory 10B. A control program stored in the memory 10B is executed and thus the CPU 10A performs various processing.

The head portion 2 accommodates a CCD camera 21A and a CCD camera 21B and an actuator 22A and an actuator 22B which rotate the head portion 2.

The CCD camera 21A and the CCD camera 21B pick-up the image of the peripheral situation, and send an obtained image signal to the controller 10. The actuator 22A and the actuator 22B rotate the head portion 2 of the robot 200 in the up and down and left and right directions.

The controller 10 properly reads the information from the memory 10B based on the voice signal and the image signal obtained from the microphone 13, the CCD camera 21A, and the CCD camera 21B, analyzes the user instruction, and determines the speech of the robot 200 and the behavior of the robot 200.

The controller 10 determines the behavior of the robot 200, thus rotating the head portion 2 in the up, down, left, and right directions based on the determining result under the control of the actuator 14A, the actuator 14B, the actuator 22A, and the actuator 22B, and moving or rotating the robot 200:

The controller 10 determines the speech or sound(s) of the robot, generates combined sound based on the determining result, and outputs the sound from the speaker 12.

Figure 10:
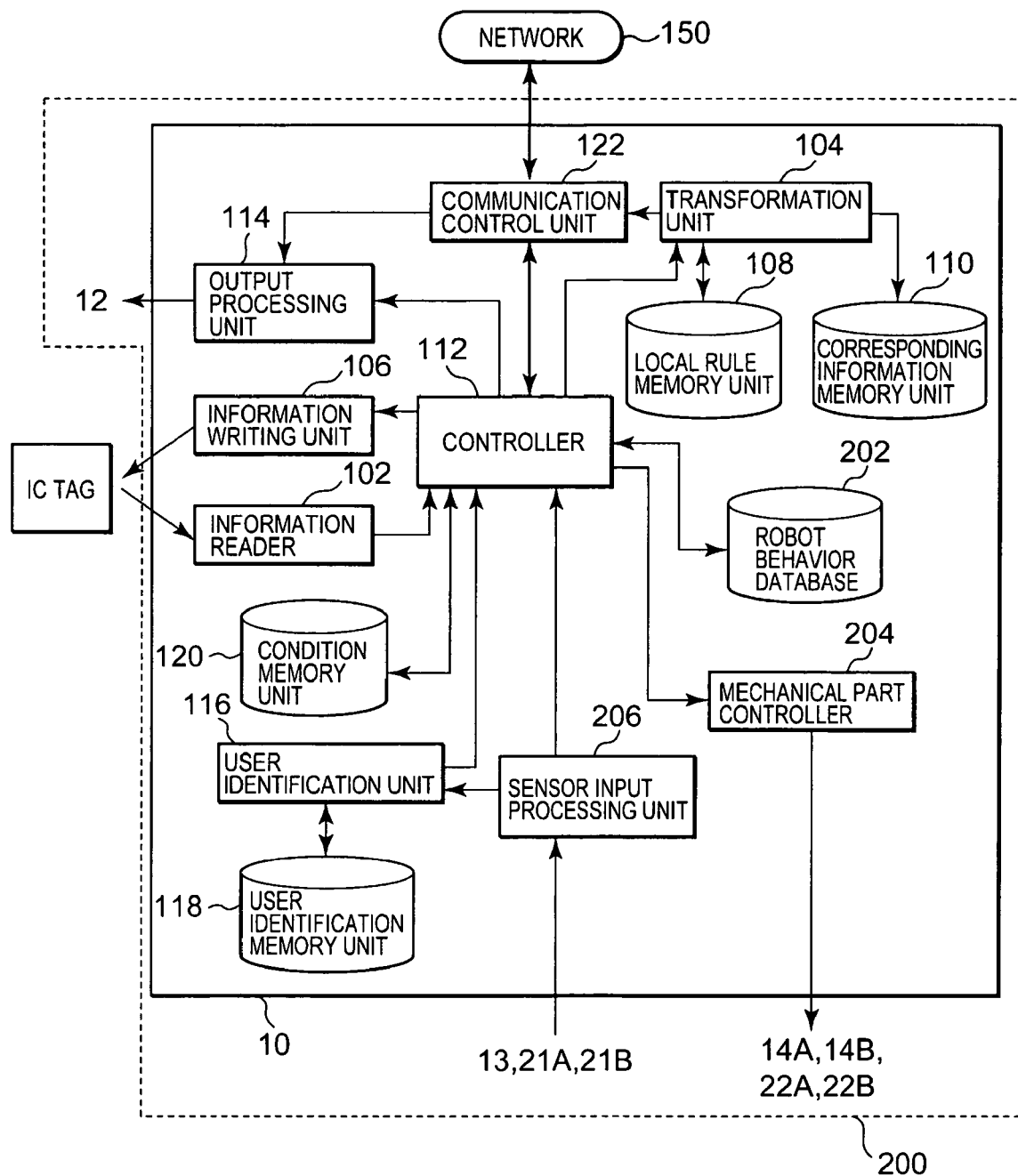
FIG. 10 is a block diagram specifically showing a controller of the robot shown in FIG. 9.

FIG. 10 is a block diagram specifically showing the controller 10 of the robot 200 shown in FIG. 9.

The controller 10 includes: the information reader 102; the transformation unit 104; the information writing unit 106; the local rule memory unit 108; the corresponding information memory unit 110; the controller 112; the output processing unit 114; the user identification unit 116; the user information memory unit 118; the condition memory unit 120; the communication control unit 122; the user indication receiving unit 124; the robot behavior database 202; the mechanical part controller 204; and a sensor input processing unit 206.

According to the third exemplary embodiment, the same reference numerals as those of the IC tag administration device 100 according to the first embodiment denote the same components, and a description thereof is omitted.

The robot behavior database 202 stores speech data and operation data in the specific situation.

The sensor input processing unit 206 identifies the user behavior and the peripheral state based on a voice signal sent from the microphone 13 and the image signal sent from the CCD cameras 21A and 21B. Then, the sensor input processing unit 206 sends the identifying result to the controller 112.

The mechanical part controller 204 generates a control signal for driving the actuators 14A and 14B, the actuators 22A and 22B based on a behavior instruction sent from the controller 112, and sends the signal to the actuators 14A, 14B, 22A, and 22B. The actuators 14A, 14B, 22A, and 22B are driven in accordance with the control signal.

The controller 112 determines the behavior of the robot 200 based on the identifying result of the sensor input processing unit 206 and speech operation information stored in the robot behavior database 202. According to the third exemplary embodiment, the output processing unit 114 includes an audio combining unit for generating the combined audio data and controls an output of the audio data which is combined by the audio combining unit.

According to the third exemplary embodiment, the IC tag administration device includes the robot 200 which is autonomously moved. Therefore, the information of the IC tags of various products is rewritten by the movement of the robot 200, e.g., at the home without moving the product having the IC tag. As a result, since the information of the IC tag is rewritten while the IC tag is in the still state, the information of the IC tag is certainly read or is written without the writing error.

According to the third exemplary embodiment, the controller 10 of the robot 200 performs the same processing sequence as that mentioned with reference to FIGS. 3 and 4 according to the first embodiment. Further, in the case of storing the product information, the same processing sequence as that mentioned with reference to FIGS. 6 and 7 according to the second exemplary embodiment is performed.

According to the third exemplary embodiment, the user identification unit 116 identifies the user based on the voice signal and the image signal (e.g., fingerprint, etc.) obtained by the sensor input processing unit 206.

Figure 11:
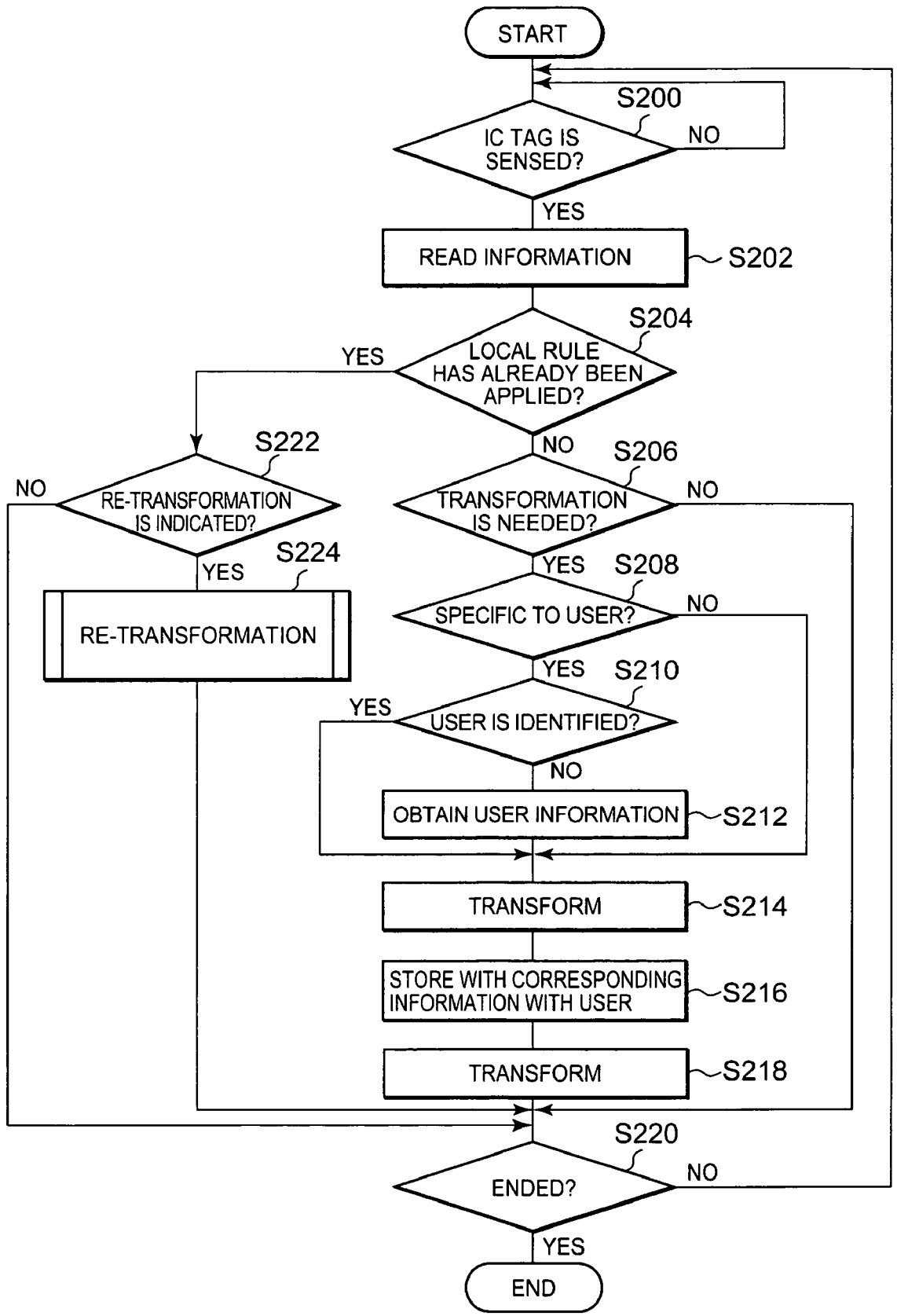
FIG. 11 is a flowchart showing an example of the processing sequence of the controller in the robot according to the third exemplary embodiment.

FIG. 11 is a flowchart of the processing sequence of the controller 10 in the robot 200 according to the third exemplary embodiment.

Upon applying the local rule to the IC tag, an example that the identification information of the IC tag, the user having the authority for re-transforming and reading the information of the IC tag, and information indicating the applying local rule are stored in the corresponding information memory unit 110 with corresponding information thereamong.

Thus, when the information of the IC tag added to the specific product at home is grasped only by the specific family, privacy is maintained.

As described above with reference to FIG. 3 according to the first embodiment, the information reader 102 senses the IC tag (YES in step S200) and then reads the code information from the IC tag (in step S202). The controller 112 determines whether or not the local rule has already been applied to the code information read by the information reader 102 (in step S204).

When the code information read by the information reader 102 is the original information (NO in step S204), the controller 112 determines whether or not the code information of the IC tag needs to be transformed (in step S206). When the controller 112 determines that the code information needs to be transformed (YES in step S206), it is determined whether or not the code information is transformed by applying the local rule specific to the user (in step S208). The controller 112 issues an instruction to the output processing unit 114, then, outputs an inquiry of "Transformed by your own rule?" from the speaker 12, and determines based on the user speech content inputted by the sensor input processing unit 206 whether or not the local rule specific to the user is applied.

When the code information is transformed by applying the local rule specific to the user (YES in step S208), the controller 112 determines whether or not the user is identified (in step S210). When the controller 112 determines that the user is not identified (NO in step S210), the user identification unit 116 obtains the user information via the sensor input processing unit 206 (in step S212), and identifies the user by referring to the user information memory unit 118. When the controller 112 determines that the user is identified (YES in step S210), the transformation unit 104 transforms the code information of the IC tag by applying the local rule specific to the user (in step S214). The transformation unit 104 stores, in the corresponding information memory unit 110, the identification information of the IC tag, the local rule applied to the IC tag, and the user identification information with corresponding information thereamong and corresponding information to the local rule (in step S216). The information writing unit 106 overwrites and stores the local rule applied information that is transformed by the transformation unit 104 to the original information of the IC tag, and rewrites the code information of the IC tag (in step S218).

After that, it is determined whether or not the sensing processing of the IC tag ends (in step S220). When it is determined that the sensing processing does not end (NO in step S220), the sensing processing of the next IC tag is waited (in step S200). When it is determined that the sensing processing ends (YES in step S220), the processing ends.

When the controller 112 determines in step S208 that the code information is not transformed by applying the local rule specific to the user (NO in step S208), the processing advances to step S214 whereupon the original information read by the information reader 102 is transformed to the local rule applied information based on the predetermined local rule (in step S214). In this case, in step S216, the transformation unit 104 stores, in the corresponding information memory unit 110, the identification information of the IC tag and the local rule applied to the IC tag with corresponding information therebetween.

When it is determined in step S206 that the code information of the IC tag does not need to be transformed (NO in step S206), the processing advances to step S220. In the example, it is determined based on the code information stored in the IC tag and the product information is outputted to the display unit if necessary.

When it is determined in step S204 that the code information read by the information reader 102 has already been transformed to the local rule applied information (YES in step S204), the controller 112 determines whether or not the re-transformation of the local rule applied information is indicated from the user (in step S222). When the controller 112 determines that the re-transformation is not indicated from the user (NO in step S222), the processing advances to step S222.

FIG. 12 is a diagram showing one example of the internal structure of the corresponding information memory unit 110 in the processing shown in FIG. 11.

The corresponding information memory unit 110 includes an IC tag ID column, a local rule column, and a user ID column. For example, information to which the local rule "(1)" is applied is stored in the IC tag having an ID "abc1" and the user ID is "mother". Information to which the local rule "(2)" is applied is stored in the IC tag having an ID "abc2" and the user ID is "family". In the IC tag having the ID "abc1", the local rule specific to the user "mother" is applied and the code information is transformed. In the IC tag having the ID "abc2", the user is "family" and the code information applied to all the members of the family is transformed without the local rule specific to the user.

The processing in step S224 is the same as that described with reference to FIG. 4 according to the first embodiment and is not shown.

In step S132, the transformation unit 104 refers to the corresponding information memory unit 110 and determines whether or not the user identified by the user identification unit 116 matches the user corresponding to the ID of the IC tag. Only when it is determined that the users match each other, the local rule applied information is re-transformed to the original information. When it is determined that the users do not match (NO in step S132), an error message of "You do not have the authority to transform the information." is notified (in step S146). The following processing is the same as that according to the first embodiment and therefore a description thereof is omitted.

In the example, the local rules varying depending on the users are applied. However, the local rule common to all the members of the family may be applied. If so, upon applying the local rule to the IC tag, the identification information of the IC tag, the user having the authority to re-transform and read the information of the IC tag, and the information indicating the applying local rule are stored in the corresponding information memory unit 110 with corresponding information thereamong. Only the specific member of the family grasps the information of the IC tag added to the specific product and the privacy is kept among the members of the family by identifying the user upon issuing the user indication for re-transforming the local rule applied information.

Figure 13:
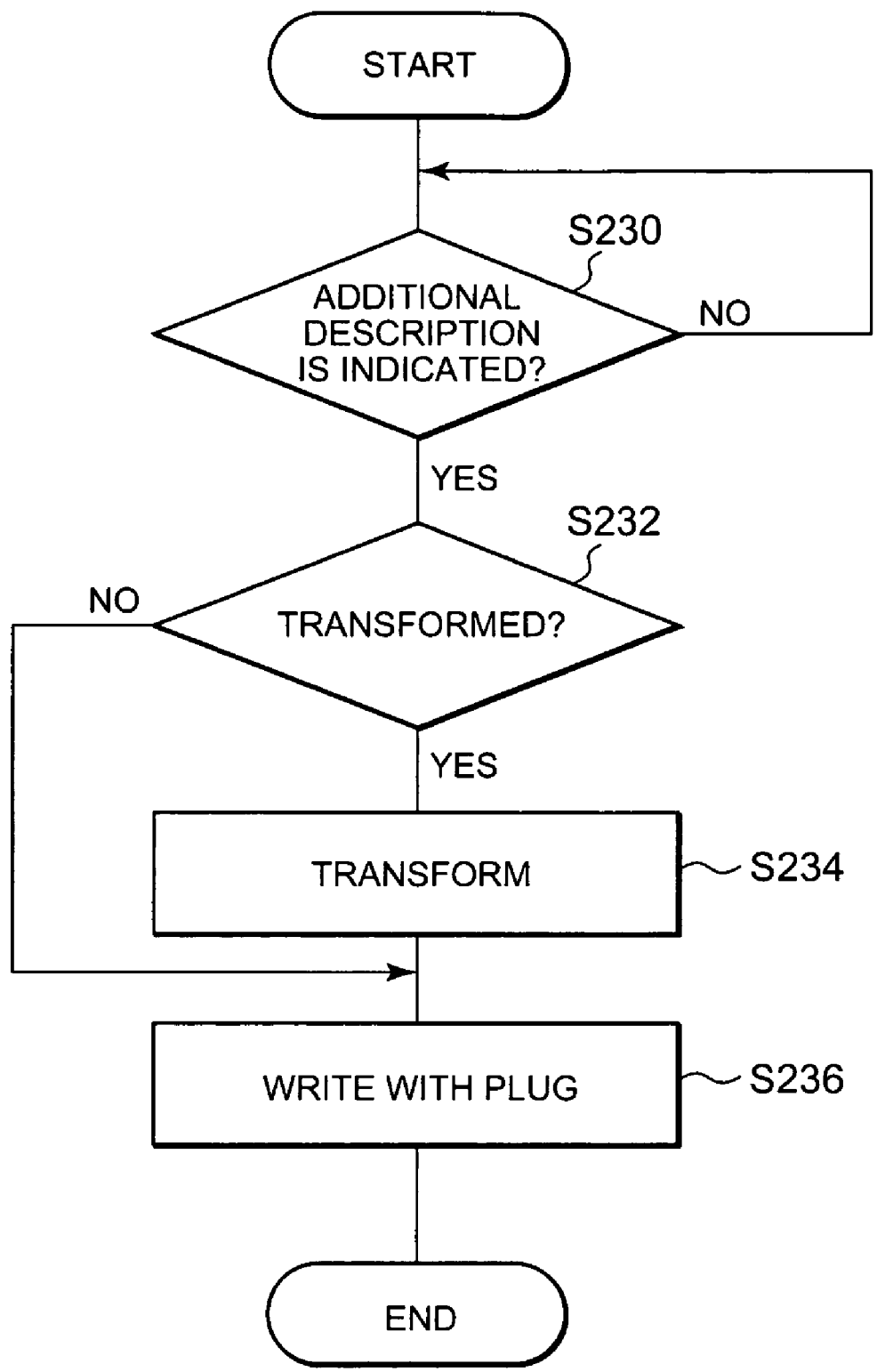
FIG. 13 is a diagram showing another example of the processing sequence of the controller in the robot according to the third exemplary embodiment.

FIG. 13 is a diagram showing another example of the processing sequence of the controller 10 in the robot 200 according to the third exemplary embodiment. The robot 200 performs the processing for writing additional information to the IC tag which is added to the product based on the user speech.

When the user issues an indication of the additional information to the IC tag (in step S230), the controller 112 determines whether or not the local rule is applied to the additional information (in step S232). When it is determined that the local rule is applied to the additional information (YES in step S232), the transformation unit 104 transforms the additional information to the local rule applied information based on the predetermined local rule (in step S234). The information writing unit 106 writes the additional information and a flag indicating the information is added to the IC tag (in step S236). When the indication for adding the information in step S230 includes the information to be added to the user speech as well as the user indication, the robot 200 may determine the execution of the description of the additional information.

For example, when the user speech includes a product owner, a provider of the product, or a quality guarantee period of the product, the robot 200 may determine the description of the additional information to the IC tag.

For example, when the user has the product having the IC tag, the output processing unit 114 outputs voice of "Whose?" from the speaker 12 based on the instruction of the controller 112. When the user answers "It is father's.", the sensor input processing unit 206 senses that the owner of the product is "father" and the information writing unit 106 writes information "Owner: father" to the IC tag as the additional information.

For example, when the user speaks the robot 200, "Store consume this sweet before the day after tomorrow", the sensor input processing unit 206 senses that the consuming limitation of the product is "the day after tomorrow" and the information writing unit 106 writes, to the IC tag, information "Consuming limitation: oo days" as the additional information.

Although not shown, the robot 200 may include a time counter which calculates which day "the day after tomorrow" is based on the current date and the speech "the day after tomorrow" of the user.

The description has been given of the processing for reading the information only by the robot 200 by applying the local rule applied information to the information stored in the IC tag upon bringing the product having the IC tag to the home. Thus, it is possible to prevent the information on the product at home from being stolen from another person.

When the local rule is applied to the IC tag and the additional information is written, there is no problem when the product having the IC tag is at home yet. However, upon disposing of the product or transferring it to another person, for example, it is necessary to return the local rule applied information to the original information and erase the additional information.

Figure 14:
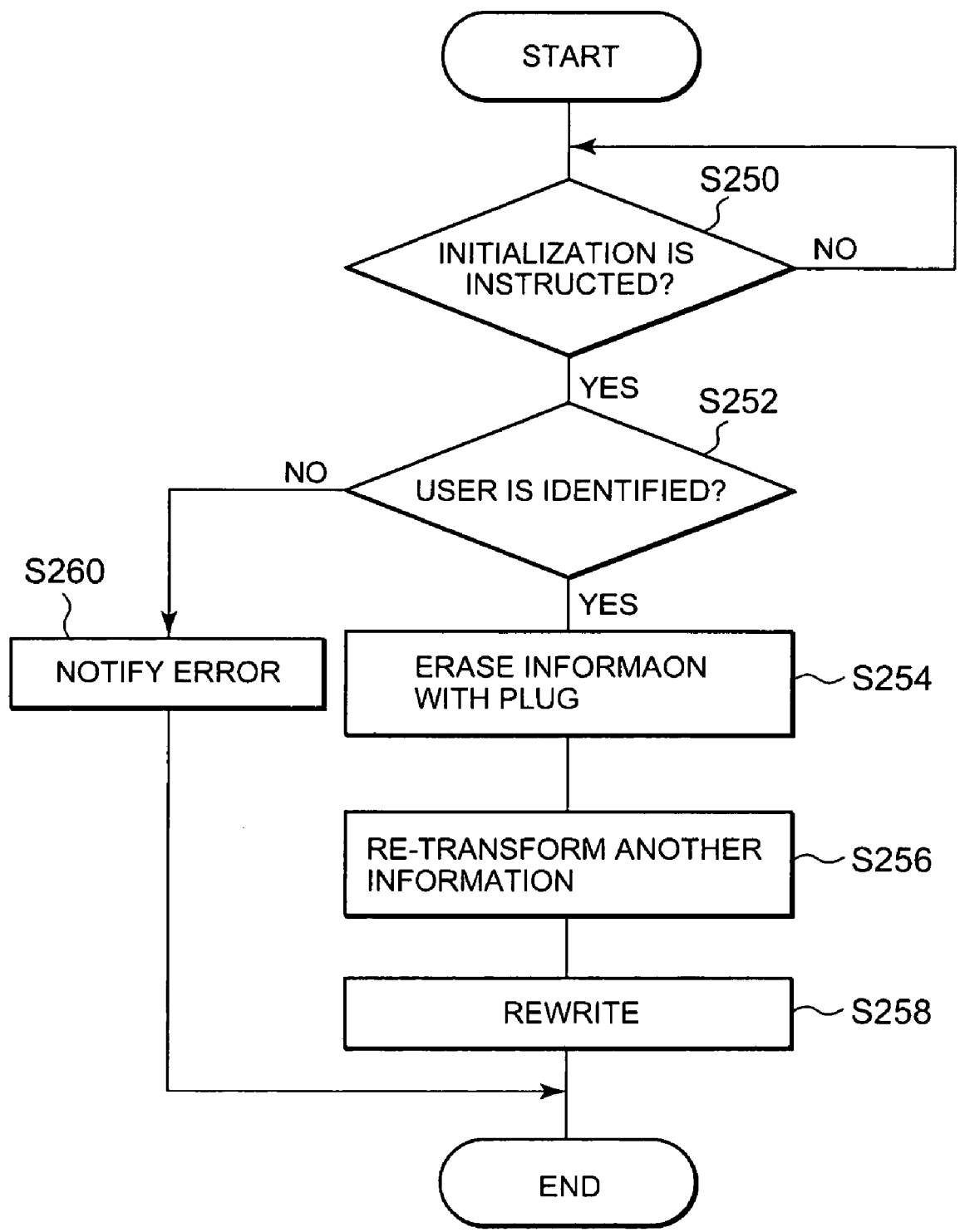
FIG. 14 is a flowchart showing the sequence for initializing the IC tag to which a local rule is applied by the controller.

FIG. 14 is a flowchart showing the sequence for initializing the IC tag to which the local rule is applied by the controller 10.

The initialization is indicated from the user (YES in step S250) and then the user identification unit 116 identifies the user (in step S252). When the user is identified (YES in step S252), the information writing unit 106 erases the information having a flag indicating the additional information (in step S254). The transformation unit 104 re-transforms another information to the original information (in step S256). The information writing unit 106 rewrites the local rule applied information by the original information which is transformed by the transformation unit 104 (in step S258).

When the user is not identified in step S252 (NO in step S252), the output processing unit 114 notifies an error (in step S260).

According to the third exemplary embodiment, the information writing unit 106 stores the additional information with corresponding information to a flag indicating that the information is the additional one. Therefore, the data to be erased is distinguished from the data not to be erased based on the presence or absence of the flag.

Since the robot 200 according to the third exemplary embodiment rewrites the information of the IC tag within the specific area such as at home, it is possible to prevent the information on the individual things from being stolen by another person by reading the information of the IC tag added to the product by the other person. Further, the information of the IC tag to which the local rule is applied is re-transformed to the original information under the local rule stored in the local rule memory unit 108. Thus, the information of the IC tag is utilized if necessary.

The robot 200 is autonomously moved at home and therefore the information of the IC tag added to the product at home is sequentially rewritten. Thus, the information of the IC tag added to the product is rewritten while the product is arranged at the predetermined position.

Further, the robot 200 has a function of the interactive-communication function with the user. Therefore, a user indication is received in the interactive communication with the user or the necessary information is obtained. Thus, it is convenient for the user.

Since the robot 200 identifies the specific partner such as the user, the user is easily identified.

As described above, the robot 200 which is autonomously moved includes the IC tag administration device. The IC tag administration device is easily handled.

Fourth Exemplary Embodiment

According to the fourth exemplary embodiment, the robot 200 has a function for sending a notification indicating the position of the product having the IC tag to the user in response to the user inquiry, in addition to the functions described according to the third exemplary embodiment. According to the fourth exemplary embodiment, the robot 200 has the same appearance as that shown in FIG. 8 and further has the same electric structure as that described with reference to FIG. 9.

Figure 15:
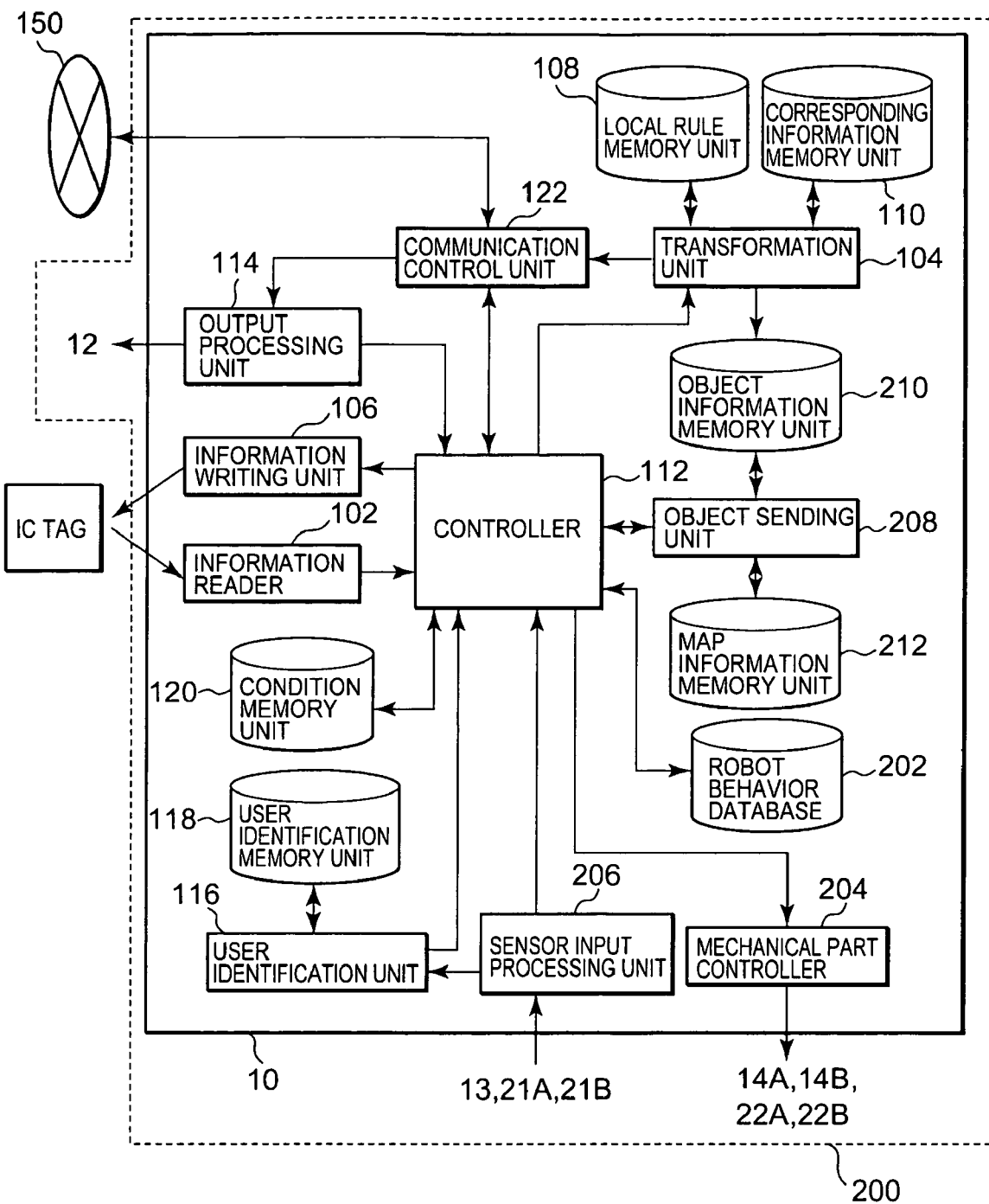
FIG. 15 is a block diagram specifically showing a controller in a robot according to the fourth exemplary embodiment.

FIG. 15 is a block diagram specifically showing the controller 10 in the robot 200 according to the fourth exemplary embodiment. In addition to the structure shown in FIG. 10, the controller 10 includes: an object sensing unit 208; an object information memory unit 210; and a map information memory unit 212.

The map information memory unit 212 stores a design plan of a house to which the robot 200 is arranged. Although not shown, the robot 200 has a position management function such as a GPS (Global Positioning System) and senses its position. As described above, the robot 200 grasps the position thereof and thus the IC tag added to the product at home is efficiently rewritten.

The transformation unit 104 stores, in the object information memory unit 210, the IC tag ID which is newly added to the IC tag and the product information having the IC tag, upon transforming the original information read from the IC tag to the local rule applied information.

According to the fourth exemplary embodiment, the robot 200 refers to the map information memory unit 212 and properly circulates in the home. The robot 200 senses the IC tag added to the product in the circulating operation, then, obtains the positional information on the arrangement of the product having the IC tag, and stores positional information in the object information memory unit 210 with corresponding information between the positional information and the identification information of the IC tag.

FIG. 16 is a diagram showing an example of the internal structure of the object information memory unit 210. The object information memory unit 210 has an IC tag ID column, a product information column, an additional-information column, and a positional-information column.

The product information of the product having the IC tag ID "abc1" is "ring, ruby, and gold". The additional information is "present from husband". The product position is "bedroom". The processing of the product having the IC tag ID "abc3" is "book, title: xxoo, writer name: xo", and the additional information and the positional information have no data.

Figure 17:
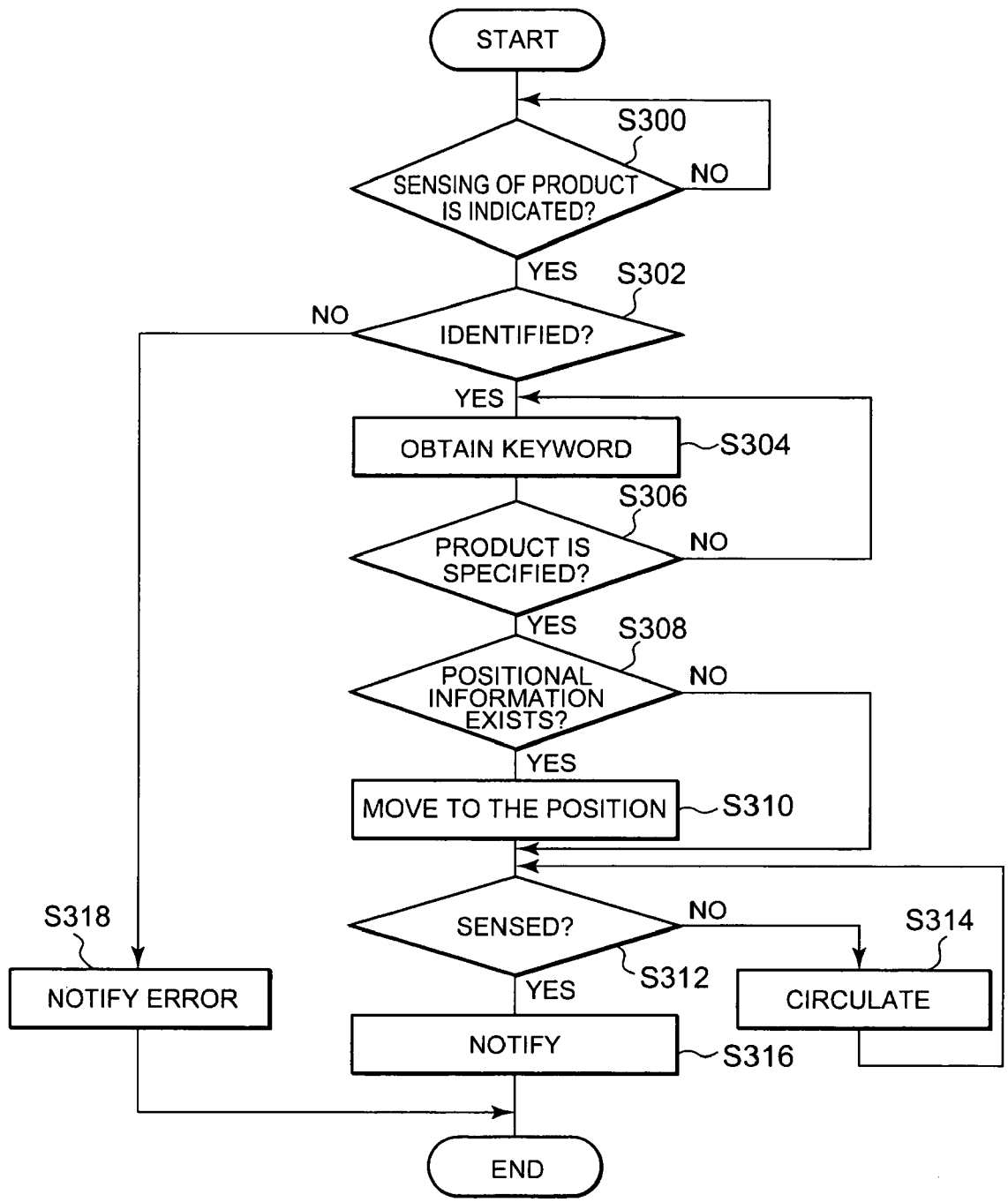
FIG. 17 is a flowchart showing the processing sequence for sensing the position of a product by the robot when a user searches for the position of the product.

FIG. 17 is a flowchart showing the processing sequence for sensing the product position by the robot 200 upon searching for the position of the product by the user.

When the user indicates the sensing operation of the product (YES in step S300), the user identification unit 116 identifies the user (in step S302). When the user is identified (YES in step S302), the sensor input processing unit 206 obtains a product keyword (in step S304). The object sensing unit 208 refers to the object information memory unit 210 and determines, based on the product keyword, whether or not the sensed product is specified (in step S306). When the product is not specified (NO in step S306), keyword is further obtained by inquiring the detailed feature of the user. In this case, when the keyword has a plurality of candidates, the user selects the keyword by presenting a photograph of the product as the candidate on the display unit. When the product as the sensing target is specified in step S306 (YES in step S306), the object sensing unit 208 refers to the object information memory unit 210 and determines whether or not the positional information of the product is stored (in step S308). When the object sensing unit 208 determines that the positional information of the product is stored (YES in step S308), the robot 200 is moved to the position, sequentially reads the IC tag information added to the product around the position, and senses the target product (in step S312). When it is determined that the product is sensed (YES in step S312), the robot 200 sends a notification to the user. When it is determined in step S308 that the positional information is stored, the robot 200 sends, to the user, a notification indicating the information "At the position of oo" before moving the robot 200 to the position. Further, the position of the target product is displayed on map information.

When the product is not sensed in step S312, the robot 200 circulates in the home and senses the target product (in step S314). In this case, the robot 200 preferentially circulates at an area having the high possibility of the product arrangement. The robot 200 senses a person other than the user who indicates the sensing operation and then the robot 200 asks the position to the person. The robot 200 performs the circulating operation until the target product is sensed.

When the user is not identified-in step S302, an error is notified (in step S318). When the user is not identified or the user is not any member of the family as a result of sensing the image, an alarm message is generated. Thus, the invasion of a robber is known to the family and the robbery is previously prevented.

Hereinbelow, an example is given. For example, when the user speaks "Where is my ruby ring?" to the robot 200 and then the robot 200 determines that the sensing operation of the product is instructed (YES in step S300), and the user is identified (in step S302).

When the user is identified (YES in step S302), the object sensing unit 208 refers to the object information memory unit 210 by using "ruby" and "ring" as keys and specifies the product. Referring to FIG. 16, it is assumed, from the keys, that the ID of the IC tag added to the product searched by the user is "abc1". Therefore, the object sensing unit 208 senses that the positional information of the product is "bedroom" (YES in step S308).

In this case, the robot 200 outputs voice "The product is at the bedroom, isn't it? I'm going to search for it.", and the robot 200 is moved to the bedroom (in step S310). The robot 200 reads the ID from the IC tag added to the product in the bedroom, and senses the IC tag of the ID "abc1". The IC tag is found (in step S312), the robot 200 outputs voice "It is here!", and sends a notification of the position of the target product to the user. In this case, the robot 200 may move to the user's position, or may output voice "It is in the bedroom". Further, the position of the target product may be displayed on the map information.

When the user has a plurality of ruby rings in step S306 and the ruby rings are stored in the object information memory unit 210, the robot 200 issues an inquiry of the product feature to the user so as to specify the product as the sensing target. For example, the robot 200 speaks "there is two ruby rings and who presented the searching ring to you?". Then, the user answers "my husband presented it to me" and narrows the candidates of the product as the sensing target. When the candidates are not narrowed by the keywords, the robot 200 displays the photograph of the product on the display unit (not shown), issues an inquiry "Is this your searching product?" and allows the user to determine the product.

The robot 200 according to the fourth exemplary embodiment has the same advantages as those of the robot 200 according to the third exemplary embodiment. Further, according to the fourth exemplary embodiment, the robot 200 grasps the position thereof and thus the IC tag added to the product at home is efficiently rewritten.

The components in the IC tag administration device and the controller of the robot according to the first to fourth exemplary embodiments are realized by arbitrarily combining a CPU and a memory in an arbitrary computer, a program for realizing the components loaded to the memory, a memory unit-such as a hard disk for storing the program, a hardware mainly including an interface for connecting a network, and software. Further, any method and device are realized according to various modifications, as will be clearly understood by one person skilled in the art. The diagrams described according to the first to fourth exemplary embodiments are shown based on blocks of functional units, not based on the structure of hardware units.

The first to fourth exemplary embodiments of the present invention are described with reference to the drawings. However, these are examples of the present invention and further can be variously structured.

The local rule memory unit 108 can store the identification information of the user and the local rule applied to the IC tag added to the user possession with corresponding information therebetween. The transformation unit 104 grasps the owner of the product added to the IC tag based on the additional information read from the IC tag by the information reader 102, and the local rule corresponding to the owner is applied to the IC tag. When the owner is not known, for example, the transformation unit 104 can apply the local rule common to all the members of the family. In this case, the IC tag administration device may not include the corresponding information memory unit. Upon indicating the re-transformation of the local rule applied information from the user, the transformation unit 104 selects the local rule used for the re-transformation based on the user identification information.

According to the first to fourth exemplary embodiments, the description has already been given of the example in which the corresponding information memory unit 110 stores the identification information of the IC tag and the information indicating the local rule applied to the IC tag with the corresponding information therebetween. However, the IC tag administration device may not include the corresponding information memory unit 110 and the IC tag may store the information indicating the local rule applied to the IC tag. The information indicating the local rule is like the identification information which is assigned to the local rule and is not information which does not re-transform the local rule applied information of the IC tag.

According to the first to fourth exemplary embodiments, upon re-transforming the information of the IC tag to which the local rule is applied, the user is identified and the information is re-transformed only upon identifying the user. Even upon applying the local rule to the IC tag which stores the original local rule, the information is transformed only upon identifying the user. Thus, it is possible to prevent another person from invading the home and to prevent the information of the IC tag from being rewritten without permission.

In the IC tag administration device according to the first to fourth exemplary embodiments, the memory units including the local rule memory unit 108, the corresponding information memory unit 110, the user information memory unit 118, the condition memory unit 120, the object information memory unit 210, and the map information memory unit 212 may be arranged to a server independently of the IC tag administration device. In this case, the IC tag administration device obtains the necessary information from the server via the wiring network or radio-frequency network.

When the information writing unit 106 writes the local rule applied information to the IC tag, the information writing unit 106 may store the original information which is stored in the IC tag for back-up in the memory unit in the IC tag administration device. In this case, the information writing unit 106 stores the original information with corresponding information with the identification information of the IC tag. Thus, even when the information stored in the IC tag is not read and is not re-transformed due to some reason later, the original information is utilized.

Upon rewriting the information by applying the local rule to the IC tag, the IC tag administration device can obtain the product image having the IC tag and can store the image in the memory unit in the IC tag administration device. Thus, as mentioned above according to the fourth exemplary embodiment, upon searching for the product position by the user, the image is presented to the user, the target product is specified with high precision, and the target product is fast found.

The shape of the robot 200 described according to the third and fourth exemplary embodiments are not limited to that shown in FIG. 8 and can be varied. The robot 200 may have an arm for attaching or detaching the IC tag. When the original information of the IC tag is not erased, the robot 200 detaches the IC tag from the product after reading the original information from the IC tag, attaches the IC tag which can be newly written to the product, and writes the information to which the local rule is applied to the IC tag.

A plurality of the robots 200 described according to the third and fourth exemplary embodiments may be arranged to the home or the like. In this case, the plurality of robots 200 have the information reading units 102 which vary depending on the information reading range and the frequency band. Thus, for example, the robot 200 having the information reader 102 with the information reading range is arranged in the center of the room and the new product having the IC tag is brought to the room, then, one robot 200 sends a notification to another robot 200, the other robot 200 is moved near the new product, and the information of the IC tag is rewritten.

One IC tag administration device or one robot has a plurality of the information readers 102 varying depending on the information reading range or frequency band.

According to the first to fourth exemplary embodiments, the IC tag administration device 100 arranged in the home, the IC tag administration device 130, and the robot 200 are described. However, the present invention can be applied to the case of arranging the IC tag administration device 100, the IC tag administration device 130, and the robot 200 to a company or a shop.

By rewriting information of the IC tag added to the product to the local rule applied information in the company, for example, it is possible to prevent the snatching of the property by an industrial espionage and to prevent the robbery of valuables by a robber. Further, by rewriting the information of the IC tag added to the product to the local rule applied information, the information collection of the product by another competitive shop is prevented at, e.g. a retail shop.

Figure 18:
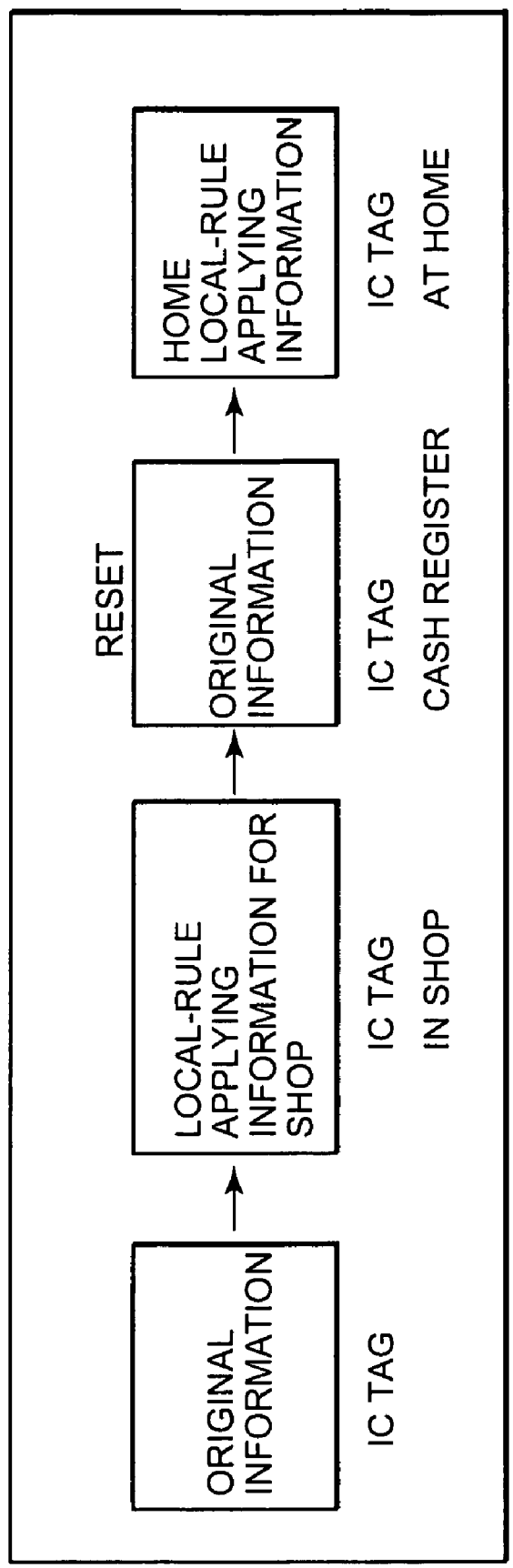
FIG. 18 is a diagram schematically showing a rewriting state of the IC tag information when a person purchases the product having the IC tag at one shop and carries the product to his/her home.

FIG. 18 is a diagram schematically showing the rewriting state of the information of the IC tag when the person who purchases the product having the IC tag at one shop carries the product to his home.

Upon carrying, to the shop, the product having the IC tag which stores the original information (global ID: code information prescribed by predetermined standard), the information of the IC tag is rewritten by applying the local rule of the shop therein. The customer purchases the product and then the information of the IC tag is re-transformed to the original information at a cash register. After that, the customer carries the product to his/her home, the information of the IC tag is rewritten by applying the local rule of the home therein. If the original information is continuously stored upon carrying the product, another person might snatch the information. Therefore, just after the customer holds the mobile IC tag administration device 100 and the information of the IC tag is re-transformed to the original information at the cash register, the information of the IC tag can be rewritten based on his local rule.

In the IC tag administration device according to the present invention, when the local rule is applied to the information of the IC tag, the information is re-transformed to the original information only after identifying the user. Therefore, it is possible to prevent the information of the IC tag without permission by another person by rewriting the information of the IC tag to the local rule applied information.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. An IC tag administration device comprising:
   a reader which reads original information from an IC tag added to an object;
   a transformation unit which transforms the original information read by said reader to local rule applied information based on a predetermined local rule; and
   a writing unit which rewrites the original information of the IC tag by the local rule applied information.

2. An IC tag administration device according to claim 1, further comprising:
   a corresponding information memory unit which stores identification information of the IC tag and information indicating the local rule which is applied to the IC tag with corresponding information therebetween.

3. An IC tag administration device according to claim 2, further comprising:
   an additional-information obtaining unit which obtains additional information that is written to the IC tag,
   wherein said transformation unit transforms the additional information obtained by said additional-information obtaining unit under the local rule applied to the IC tag by referring to said corresponding information memory unit, and
   said writing unit writes the additional information transformed by said transformation unit to the IC tag.

4. An IC tag administration device according to claim 3, wherein said writing unit writes, to the IC tag, the additional information transformed by said transformation unit together with information indicating the addition of the additional information.

5. An IC tag administration device according to claim 4, further comprising:
   an identification unit which identifies a user; and
   an initialization receiving unit which receives an initialization indication for initializing the IC tag to which the local rule is applied from the user who is identified by said identification unit,
   wherein said initialization receiving unit receives the initialization indication and, then, said transformation unit re-transforms the information to which the local rule is applied to the original information by referring to said corresponding information memory unit, and
   said writing unit rewrites the information of the IC tag, to which the local rule is applied, by the original information re-transformed by said transformation unit, and erases the additional information.

6. An IC tag administration device according to claim 5, further comprising:
   an image capturing unit; and
   a user information memory unit which stores user face image data,
   wherein said identification unit identifies the user based on image data captured by said image capturing unit and face image data stored in said user information memory unit.

7. An IC tag administration device according to claim 2, further comprising:

an identification unit which identifies a user, wherein said transformation unit re-transforms information stored in the IC tag, to which the local rule is applied, under the local rule applied to the IC tag by referring to said corresponding information memory unit based on a user indication identified by said identification unit.

8. An IC tag administration device according to claim 7, further comprising:

an output processing unit which outputs the information re-transformed by said transformation unit.

9. An IC tag administration device according to claim 7, wherein said writing unit rewrites the IC tag by the information re-transformed by said transformation unit.

10. An IC tag administration device according to claim 1, further comprising:

an object information memory unit which stores the identification information of the IC tag and a keyword of a product having the IC tag with corresponding information therebetween;

an identification unit which identifies the user;

a keyword obtaining unit which obtains the keyword of the product serving as a sensing target from the user identified by said identification unit; and a sensing unit which senses the object as the sensing target by referring to said object information memory unit based on the keyword obtained by said keyword obtaining unit.

11. An IC tag administration device according to claim 10, wherein said object information memory unit stores positional information of the product with corresponding information between the positional information and the identification information of the IC tag, and said sensing unit which senses the product as the sensing target in consideration of the positional information of the product.

12. An IC tag administration device according to claim 1, further comprising:

a condition memory unit which stores a product condition for rewriting the original information to the information to which the local rule is applied, wherein said transformation unit determines whether or not the original information should rewrite with the information to which the local rule is applied based on the original information read by said reading unit and, upon determining that the original information is rewritten, rewrites the original information to the information to which the local rule is applied.

13. An IC tag administration device according to claim 1, further comprising:

a speech recognition unit which identifies user voice and receives a user indication as voice; and a voice output unit which outputs the voice.

14. A robot, comprising:

an IC tag administration device according to claim 1;

a moving unit which moves said IC tag administration device; and an operation control unit which controls said moving unit characterized in that said robot moves autonomously.

15. A robot according to claim 14, further comprising:

a positional information obtaining unit which obtains a position thereof, and wherein said operation control unit controls said moving unit based on the position of said positional information obtaining unit obtained thereby.

16. A robot according to claim 14, further comprising:

a voice identification unit which identifies user voice and receives a user indication as voice;

an operation determining unit which determines an operation corresponding to the user voice; and a voice output unit which outputs the voice based on the determination of said operation determining unit.

17. A robot comprising an IC tag administration device according to claim 1.

18. An IC tag administration device according to claim 1, wherein the local rule used by said transformation unit comprises a rule which shifts code information included in the original information by several bits.

19. An IC tag administration device according to claim 1, wherein the local rule used by said transformation unit comprises a rule which encrypts code information included in the original information.

20. An IC tag administration device according to claim 1, wherein the local rule used by said transformation unit masks a specific part including any of a product genre of code information included in the original information or product code.

21. An IC tag administration device according to claim 1, wherein the local rule used by said transformation unit newly rewrites code information included in the original information.

22. An IC tag administration method, comprising:

reading original information from an IC tag added to an object;

transforming the original information read in said reading step of the original information to information, to which a predetermined local rule is applied, under the local rule; and rewriting the original information of the IC tag by the information to which the local rule is applied.

23. A computer for storing an IC tag administration program of a computer, said computer comprising:

reading means which reads original information from an IC tag added to a product;

transforming means which transforms the original information read by said reading means to information, to which a predetermined local rule is applied, under the local rule; and rewriting means for rewriting the original information of the IC tag by the information to which the local rule is applied.

24. A computer included in a robot comprising moving means and storing a robot control program, said computer comprising:

reading means which reads original information from an IC tag added to a product;

transforming means which transforms the original information read by said reading means to information, to which a predetermined local rule is applied, under the local rule;

rewriting means the original information of the IC tag by the information to which the local rule is applied; and operation control means which controls said moving means, wherein said robot is autonomously moved.

25. An IC tag administration device comprising:

a reader means for reading original information from an IC tag added to an object;

a transformation means for transforming the original information read by said reader to local rule applied information based on a predetermined local rule; and a writing means for rewriting the original information of the IC tag by the local rule applied information.

* * * * *